United States Patent [19]

Harada et al.

[11] Patent Number: 4,963,895
[45] Date of Patent: Oct. 16, 1990

[54] ILLUMINATION/RECORDING SYSTEM WITH MOVABLE FLUORESCENT SUBSTANCES

[75] Inventors: Toshiaki Harada; Tadashi Yamamoto, both of Kawasaki; Masanori Takenouchi, Atsugi, all of Japan

[73] Assignee: Canon Kabushiki Kaisha, Tokyo, Japan

[21] Appl. No.: 300,692

[22] Filed: Jan. 19, 1989

Related U.S. Application Data

[63] Continuation of Ser. No. 41,043, Apr. 21, 1987, abandoned.

[30] Foreign Application Priority Data

Apr. 24, 1986 [JP] Japan .................. 61-93368
Sep. 11, 1986 [JP] Japan .................. 61-212802
Sep. 11, 1986 [JP] Japan .................. 61-212803
Sep. 24, 1986 [JP] Japan .................. 61-223726
Nov. 27, 1986 [JP] Japan .................. 61-280738

[51] Int. Cl.⁵ .................. G01D 15/14; H01J 40/14; H04N 1/46
[52] U.S. Cl. .................. 346/108; 358/75; 250/578; 362/223
[58] Field of Search .......... 346/108, 107 R; 358/75, 358/293, 294, 296; 250/578; 362/223, 231, 238, 240, 260

[56] References Cited

U.S. PATENT DOCUMENTS

| 3,944,356 | 3/1976 | Hayne . |
| 4,255,042 | 3/1981 | Armitage . |
| 4,438,453 | 3/1984 | Alston .................. 358/75 |
| 4,459,512 | 7/1984 | Ohhata .................. 346/110 R |
| 4,692,795 | 9/1987 | Nakao .................. 358/75 |

FOREIGN PATENT DOCUMENTS 2113860 11/1985 United Kingdom .

Primary Examiner—Mark J. Reinhart
Attorney, Agent, or Firm—Fitzpatrick, Cella, Harper & Scinto

[57] ABSTRACT

An illumination apparatus adapted for illuminating a subject with light comprises a plurality of fluorescent substances each having a different spectral characteristic, a drive device for repetitively locating the fluorescent substances at a predetermined position and a light source for illuminating the fluorescent substances. The illumination apparatus further includes a slit for focusing light on a subject to be illuminated. If the illumination apparatus is incorporated as a transfer section into a recording system such as a facsimile and a copying machine, since the fluorescent substances are alternately positioned at a predetermined location to illuminate a recording sheet, it is possible to obtain a clearly recorded image with high precision and at high speed.

28 Claims, 22 Drawing Sheets

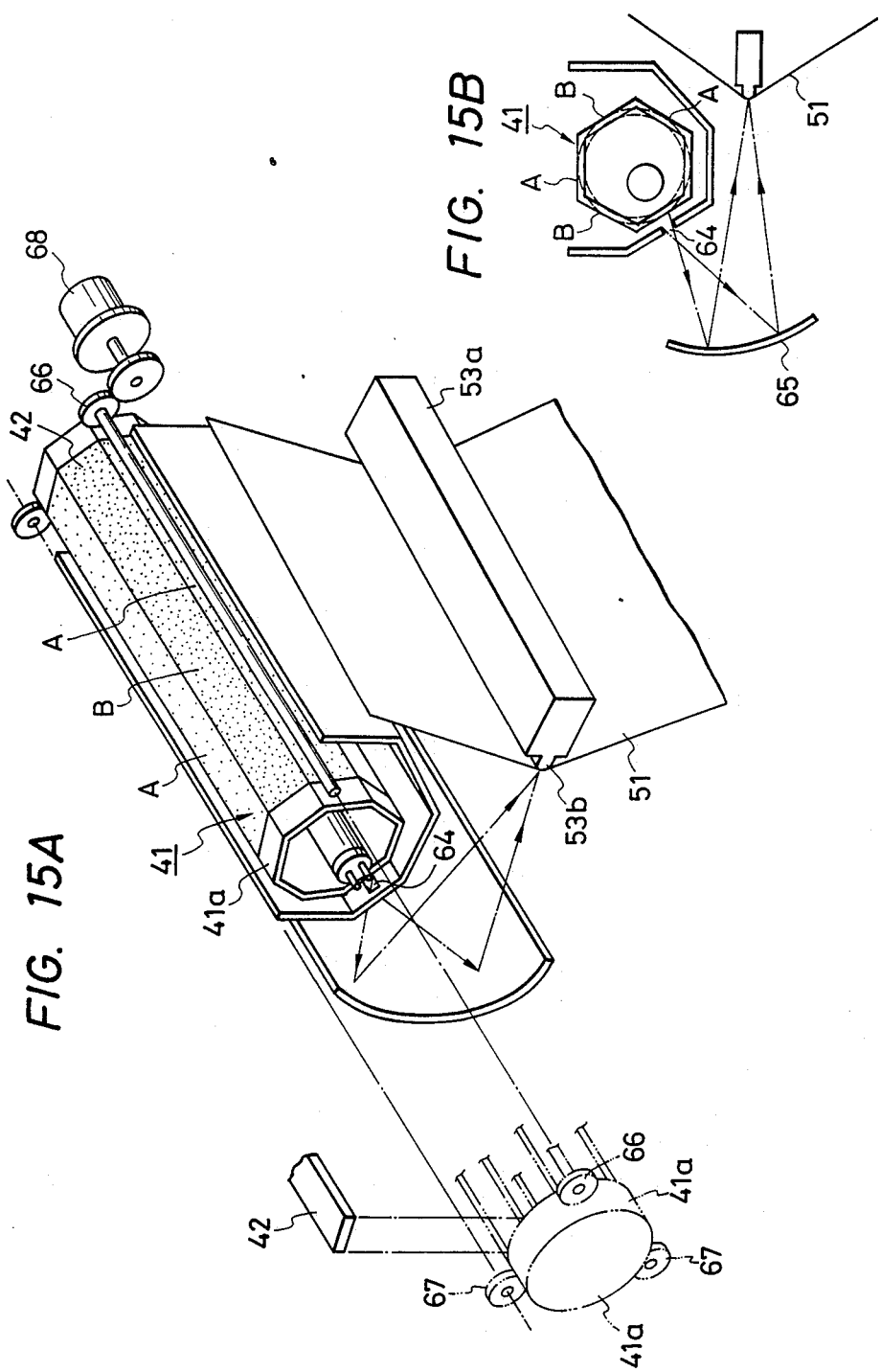

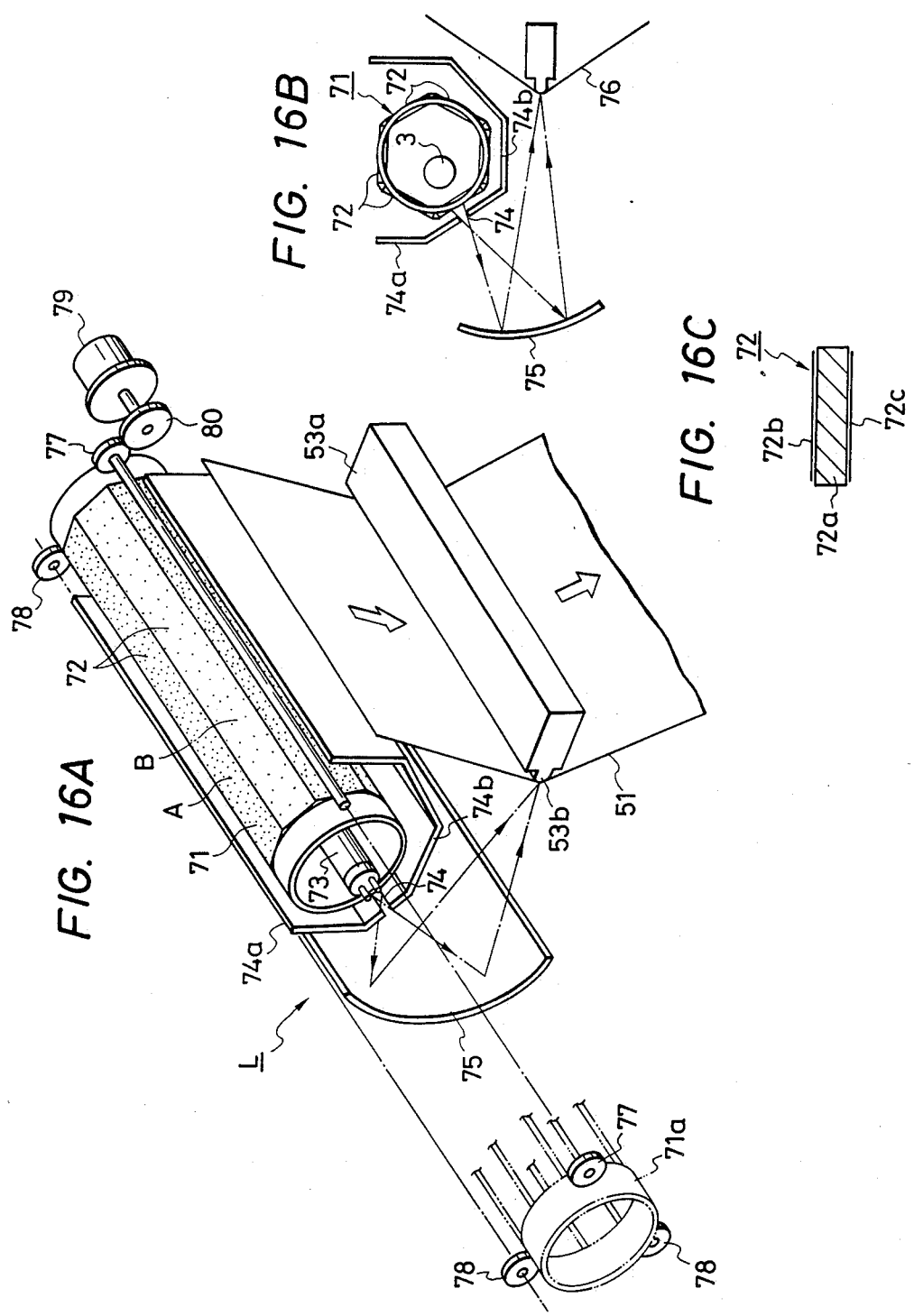

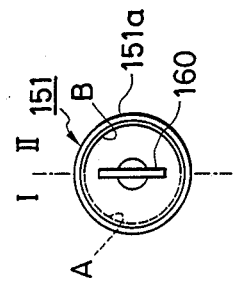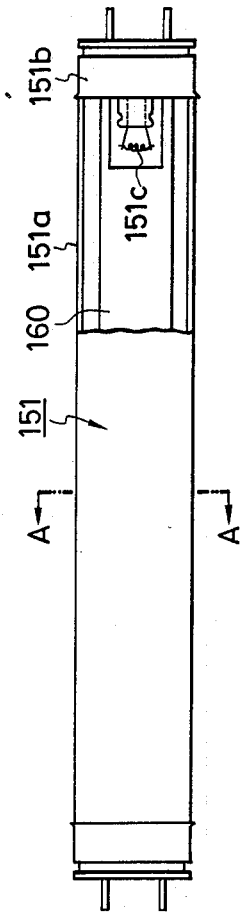
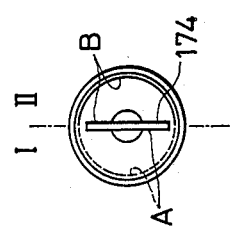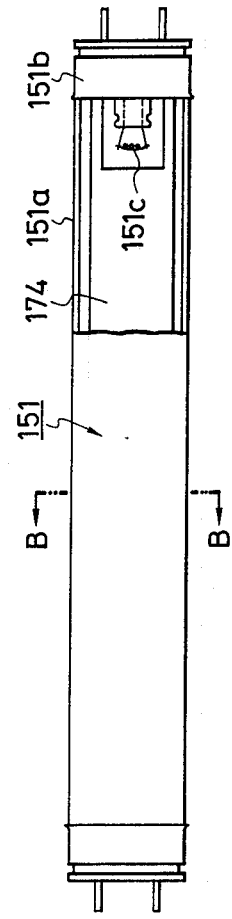
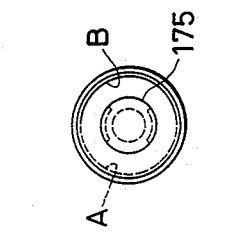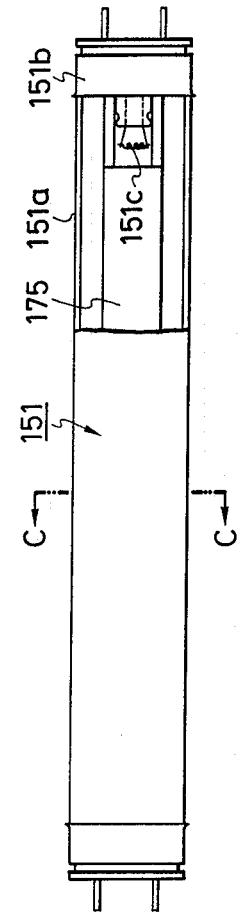

4,963,895

ILLUMINATION/RECORDING SYSTEM WITH MOVABLE FLUORESCENT SUBSTANCES

This application is a continuation of application Ser. No. 041,043 filed Apr. 21, 1987, now abandoned.

BACKGROUND OF THE INVENTION

1. Field of the Invention

The present invention relates to an illumination apparatus and a recording system incorporating the same, both of which are applicable to a recording section or an optical system adapted for use in a printer, a copying machine, a facsimile or the like.

2. Related Background Art

With the rapid evolution of the information industry, a variety of information processing systems have been developed in recent years and developments have also been made based on the concept of a recording system suitable for use with respective types of information processing systems.

It has heretofore been necessary that such a recording system be arranged to illuminate an elongated, extremely narrow area with light having a plurality of different spectral characteristics in a high-speed switched-over manner. In this case, however, it is difficult to illuminate such an extremely narrow area while illuminating light is being switched over between a plurality of wavelengths at high speeds, and this imposes limitatons on any increase in image recording speed

SUMMARY OF THE INVENTION

It is therefore an object of the present invention to provide an illumination apparatus capable of illuminating an extremely narrow area with light and a recording system incorporating such an illumination apparatus.

It is another object of the present invention to provide an illumination apparatus capable of effecting illumination while illuminating light is being switched over between a plurality of different spectral characteristics, as well as a recording system incorporating such an illumination apparatus.

It is another object of the present invention to provide an illuminating apparatus capable of illuminating an extremely narrow area while illuminating light is being switched over between a plurality of different spectral characteristics at high speed, as well as a recording system incorporating such an illumination apparatus.

It is another object of the present invention to provide an illumination apparatus which can be manufactured with ease and high accuracy, as well as a recording system incorporating such an illumination apparatus.

It is still another object of the present invention to provide an illumination apparatus capable of illuminating a subject with light emitted from excited fluorescent substances at certain time intervals and over a predetermined period, as well as a recording system incorporating such an illumination apparatus.

BRIEF DESCRIPTION OF THE DRAWINGS

FIGS. 15A and 15B are schematic views respectively showing modifications of the second preferred embodiment of the illumination apparatus;

FIG. 16A is a schematic, perspective view of a third preferred embodiment of the illumination apparatus in accordance with the present invention;

FIGS. 16B and 16C are respectively schematic views used as an aid in explaining particular portions of the illumination apparatus shown in FIG. 16A;

FIG. 25A is a partial, longitudinal cross-section of a fluorescent lamp used in the respective embodiments;

FIG. 25B is a cross-sectional view taken along the line A—A of FIG. 25A;

FIG. 28A is a partial, longitudinal cross-section of another example of the fluorescent lamp shown in FIG. 25A;

FIG. 28B is a cross-sectional view taken along the line B—B of FIG. 28A;

FIG. 29A is a partial, longitudinal cross-section of yet another example of the fluorescence lamp shown in FIG. 25A; and FIG. 29B is a cross-sectional view taken along the line C—C of FIG. 29A.

DETAILED DESCRIPTION OF THE PREFERRED EMBODIMENTS

An illumination apparatus in accordance with the present invention and a recording system incorporating the same will be described below in conjunction with preferred embodiments and with reference to the accompanying drawings.

A first preferred embodiment which will be described below with specific reference to FIGS. 1 through 9 comprises a rotary member having at least two kinds of fluorescent substance; drive means for causing rotation of the rotary member about its axis; and means for causing the fluorescent substances to emit light, whereby a subject is illuminated by the light from the fluorescent substances. A recording system incorporating the first embodiment is arranged in such a manner that the aforesaid illumination apparatus imparts light energy to an image forming member, an image being formed thereon, and the image thereby being transferred onto a recording medium such as copy paper.

In such an arrangement, light is caused to be emitted from the fluorescent substances by the means for causing emission therefrom, and the light thus emitted illuminates the subject. If the rotary member having at least two kinds of fluorescent substance is made to rotate about its axis during this illumination, the subject can be illuminated by light which has a plurality of spectral characteristics though being emitted from one and the same position. It follows that, if such light is made to pass through a slit or the like, light having a plurality of spectral characteristics is capable of exactly illuminating an extremely narrow area that is required to be illuminated.

Figure 1:
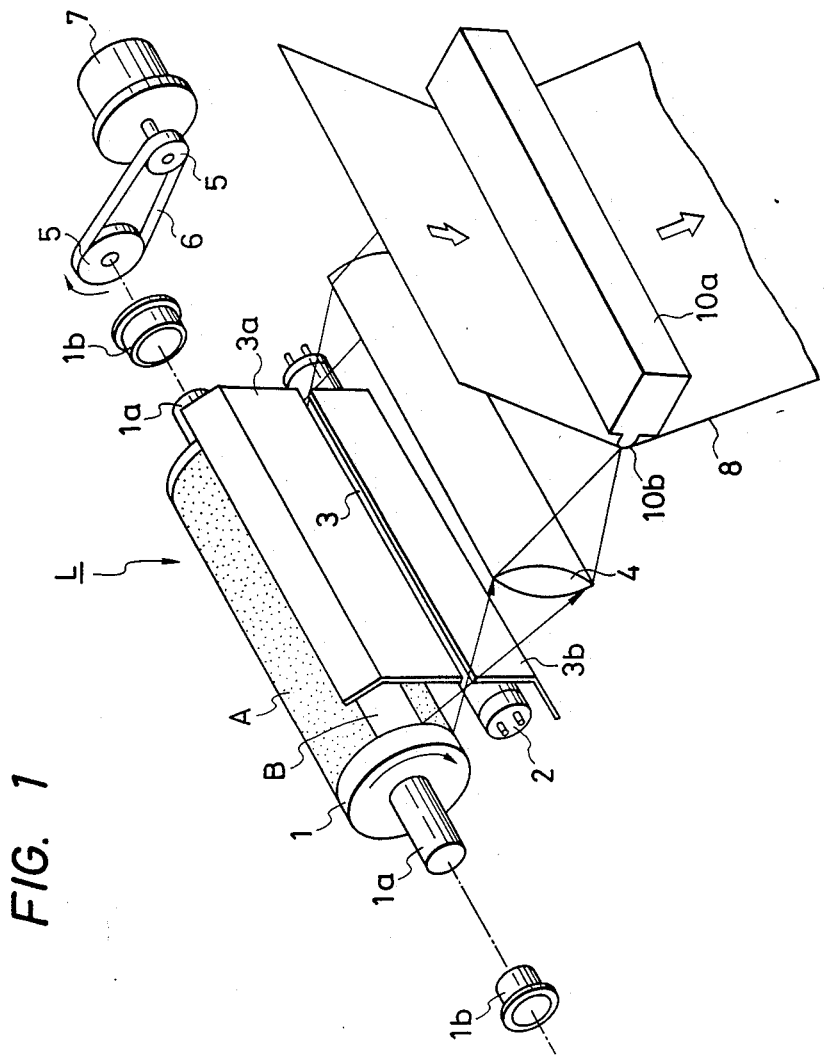
FIG. 1 is a schematic view showing, in perspective, a first preferred embodiment of an illumination apparatus in accordance with the present invention.

FIG. 1 is a schematic, perspective view of an illumination apparatus indicated generally at L, the apparatus L being capable of realizing two kinds of spectral characteristics. As shown, a rotary member 1 includes an aluminum cylinder and its surface is divided at intervals of 45 degrees in the circumferential direction, that is, into eight equal parts, which are alternately coated with two kinds of fluorescent substances A and B. The fluorescent substance A is composed of calcium zinc phosphate as a base substance and thallium as an activator while the fluorescent substance B is composed of barium silicate as a base substance and lead as an activator. A light source 2 is constituted by a germicidal lamp GL-10 and is adapted to cause excited emission of the fluorescent substances A and B. The respective fluorescent substances A and B are composed in such a manner that, if the light emitted from the light source 2 causes excited emission of the fluorescent substances A and B, they respectively exhibit the spectral distributions shown in FIG. 2.

When the light emitted from the light source 2 illuminates the fluorescent substances A and B on the rotary member 1, the fluorescent substances A and B emit light. The emitted light passes through a slit 3 and a convex cylindrical lens 4, and is focused on a subject to be illuminated; in this embodiment a transfer recording medium 8 which will be described later. The slit 3 is 0.5 mm in width, and is defined between the two adjacent edges of slit defining plates 3a and 3b which are both disposed normal to the optical axis directed toward the lens 4 from the fluorescent substances A and B. The light passing through the slit 3 is capable of being converged onto the subject 8 with an illumination width of 0.125 mm or less through the convex cylindrical lens 4.

Figure 2:
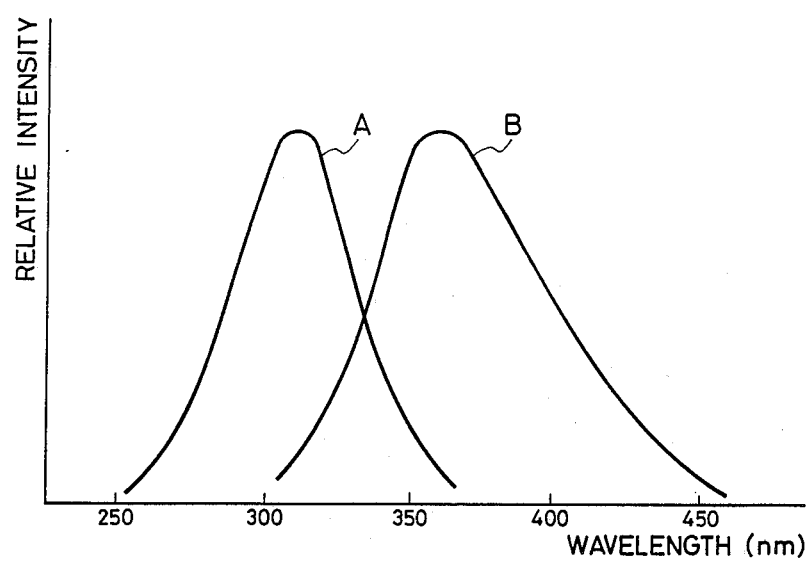
FIG. 2 is a graph showing the characteristics of spectral distribution of emission from fluorescent substances which are coated over a rotating member.

The lens 4 is typically made of a given material having proper transmittance in the wavelength range corresponding to the spectral characteristics shown in FIG. 2. In this embodiment, quartz glass is used by way of example.

Moreover, the rotary member 1 has the rotary shaft $1a$, and the opposite ends of the rotary shaft $1a$ are rotatably supported by bearings $1b$. One end of the rotary shaft $1a$ is coupled with a servo motor 7 via a pulley 5 and a timing belt 6 so that the rotary member 1 is rotated about its axis at a constant speed.

Accordingly, when the rotary member 1 is caused to rotate about its axis, the fluorescent substances A and B are alternately excited to emit light by virtue of the light emanating from the light source 2, and the thus-obtained light having different spectral characteristics illuminates the subject 8 through the slit 3 and the lens 4.

In general, when illumination is to be performed with waves each having a different wavelength, it is necessary to dispose a plurality of light sources constituted by fluorescent lamps corresponding to the respective wavelengths that will be employed. In this arrangement, since the respective waves are emitted at different positions, the thus-emitted light as a whole tends to illuminate a wide area of the subject through the slit. However, the presently preferred embodiments enable emission of light with different wavelengths from the same position on the rotary member. Therefore, after the light has passed through the slit 3, the light can be focused on the subject 8 in an extremely narrow form (e.g. about 0.125 mm in width) by means of the lens 4.

An example of a recording system incorporating the aforesaid illumination apparatus will be described below with reference to FIGS. 1 and 3.

The transfer recording medium shown in FIG. 4 and the recording system to be later described are not confined solely to the presently disclosed embodiments. When occasion demands, it may also be suitable to utilize another transfer recording medium and an image forming process of the type disclosed in the specification of U.S. Pat. application Ser. No. 869,689, filed by the present applicant on June 2, 1986.

Figure 3:
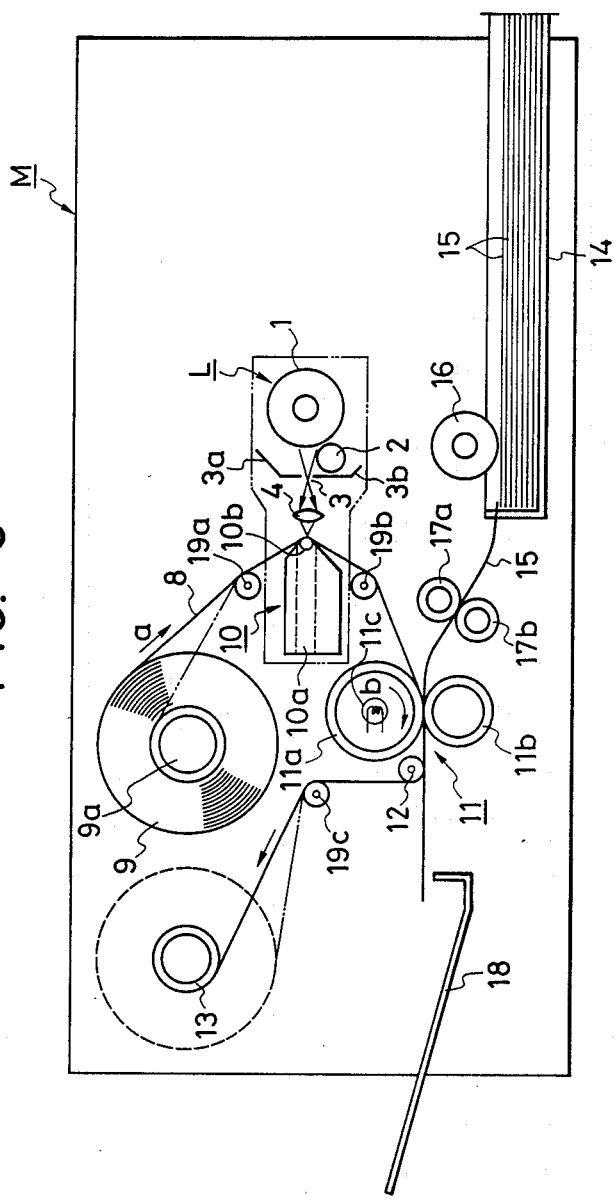
FIG. 3 is a diagrammatic view of an example of a recording apparatus which is constructed having the illumination apparatus shown is FIG. 1.

Referring to FIG. 3, a transfer recording medium 8 has an elongated sheet like shape, and is rolled to form a supply roll 9. The supply roll 9 is detachably incorporated into a system body indicated generally at M. More specifically, the supply roll 9 is detachably fitted onto a shaft $9a$ which is rotatably disposed in the system body M.

The leading end of the transfer recording medium 8 is extracted from the supply roll 9, passed by a guide roller 19a, a recording head 10a and a guide roller 19b, and passed through the nip between a transfer roller 11a and a pressure roller 11b. The leading end is then turned along a release roller 12 and a guide roller 19c, reaching a take-up roll 13, and engaging with a gripper (not shown) of the take-up roll 13. Subsequently, if the take-up roll 13 is driven to rotate by a known type of drive means, the transfer recording medium 8 is supplied in the direction of an arrow a, and is wound up around the take-up roll 13 one sheet after another.

It is to be noted that, during the aforesaid take-up operation, a constant level of back tension is imparted to the supply roll 9 by, for example, a hysteresis brake (not shown). Therefore, the application of the back tension and the action of the guide rollers 19a and 19b cooperate to transport the transfer recording medium 8 while it is maintained in contact with the recording head 10a at a fixed pressure and angle relative thereto.

The constructions of the aforesaid portions will be individually described below.

Figure 4:
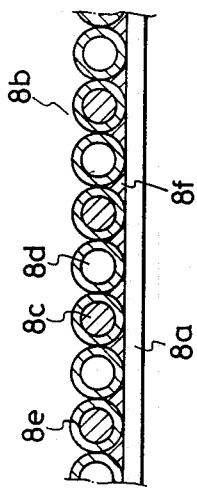
FIG. 4 is a schematic view used as an aid in explaining the construction of a transfer recording medium employed in the second embodiment.

As shown in FIG. 4, the transfer recording medium 8 has a sheet-like substrate 8a on which a transfer-recording layer 8b is deposited, the transfer-recording layer 8b having the property of enabling an image to be formed thereon when subjected to heat energy and light energy at the same time.

An example of the transfer recording layer 8b is described below in detail. As shown in FIG. 4, the layer 8b includes cores 8c and 8d containing the components listed in Tables 1 and 2 which will be described later, the respective cores 8c and 8d being formed into microcapsular image forming elements by the following method.

The respective groups of components shown in Tables 1 and 2 were each mixed with 20 parts by weight of methylene chloride, and further mixed with 200 ml of water in which a surface active agent and 1 g of gelatin has been dissolved, the surface active agent being preferably cation, nonion or other substances each having a H.L.B. value of 10 or greater. The thus-obtained aqueous mixture was warmed at 60° C. and agitated and emulsified by a homomixer at speeds of 8,000 to 10,000 rpm. Oil particles having an average particle diameter of 26 μm were thus obtained.

In this state, agitation was further continued at a temperature of 60° C. for 30 minutes, whereby methylene chloride was distilled out of the oil particles, thereby obtaining oil particles having an average particle diameter of 10 μm. Then, 20 ml of water in which 1 g of gum arabic is dissolved is added to the solution. Then, while it was slowly allowed to cool, $NH_4OH$ (ammonia) water was added thereto so as to adjust the solution to PH 11 or greater, thereby obtaining a microcapsular slurry. The capsule walls were hardened by slowly adding 1.0 ml of an aqueous solution containing 20 % glutaric aldehyde. Subsequently, the slurry was subjected to solid-liquid separation by means of a Nutsche filter, and dried at 35° C. for 10 hours in a vacuum desiccator, thereby obtaining microcapsular image forming elements.

The thus-obtained image forming elements respectively constituted microcapsules having a structure in which the core 8c or 8d was coated with a shell 8e, their particle diameters being 7 to 15 μm, on average 10 μm. Tables 1 and 2 respectively show the components of the cores 8c and 8d.

The image forming elements formed in the aforesaid manner were bonded by an adhesive 8f to a carrier 8a which was a 6 μm thick polyethylene telephthalate film, the adhesive 8f being a 5% PVA aqueous solution containing a quantity of surface active agent equivalent to several droplets per 100 cc of the solution. Thus, the transfer recording layer 8b was formed to obtain the transfer recording medium 8.

TABLE 1

| Item | Component | wt % |
|---|---|---|
| Polymerizable Prepolymer | $(CH_2=CHCOOCH_2.CH_2.O.CO.NH-\langle H \rangle_{\overline{2}} CH_2)$ | 70 |
| Reaction initiator | Irgacure-907 (Manufactured by CIBA-GEIGY) | 11 |
| Binder | Elvacite 2041 (Manufactured by duPont) | 17 |
| Coloring Agent | Diaresin Red K (Manufactured by Mitsubishi Chemical Industries, Ltd.) | 2 |

TABLE 2

| Item | Component | wt % |
|---|---|---|
| Polymerizable Prepolymer | $(CH_2=CHCOOCH_2.CH_2.O.CO.NH-\langle H \rangle_{\overline{2}} CH_2)$ | 75 |
| Reaction initiator | 2-chlorothioxanthone Ethyl-p-dimethylaminobenzoate | 1.5/3 |
| Binder | Elvacite 2041 (Manufactured by duPont) | 18.5 |
| Coloring Agent | Diaresin Blue K (Manufactured by Mitsubishi Chemical | 2 |

TABLE 2-continued

| Item | Component | wt % |
|---|---|---|
| | Industries, Ltd.) | |

Figure 5:
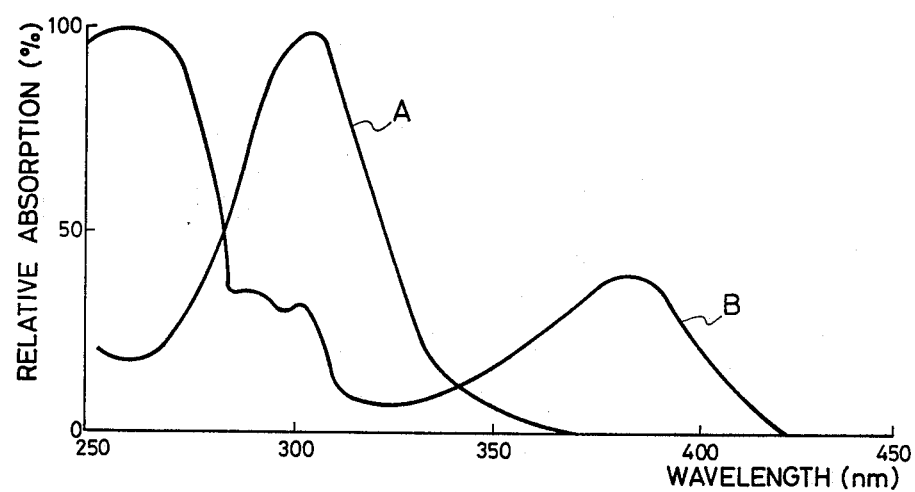
FIG. 5 is a graph showing the absorption characteristics of a light starting agent contained in the transfer recording medium in accordance with the present invention.

Referring to FIG. 5 showing absorption characteristics, the reaction initiator in the image forming element shown in Table 1 starts its reaction when absorbing the light in the wavelength range indicated by a curve A, exhibiting magenta in an image formed. On the other hand, the reaction when absorbing the light Table 2 starts its reaction when absorbing the light in the wavelength range indicated by a curve B, exhibiting blue in an image formed.

A recording section indicated generally at 10 will be described below. The recording section 10 includes heating means and the previously-described illumimating means.

The heating means is constituted by a heat element array 10b which is formed on the surface of a recording head 10a in such a manner as to generate heat in response to an image signal, the heat element array 10b having a width of 0.2 mm and being of an A-4 sized line type with 8 dots/mm. As previously described, while the transfer recording medium is being transported, the carrier 8a thereof is adapted to be brought into contact with the heat element array 10b at a predetermined level of pressure by virtue of the back tension. Incidentally, as occasion demands, the aforesaid image signal may be generated by a control portion (not shown) incorporated into a facsimile, an image scanner, a copying machine, an electronic blackboard or the like.

The aforesaid illumination apparatus L shown in FIG. 1 is disposed on the side of the transfer recording layer 8b facing the recording head 10a, thereby constituting illuminating means.

A transfer section indicated generally at 11 will be described below. The transfer section 11 is disposed on the downstream side of the recording section 10 taken in the direction in which the transfer recording medium 8 is transported. As shown in FIG. 3, the transfer section 11 includes the transfer roller 11a and the pressure roller 11b which is pressed against the roller 11a. The transfer roller 11a is an aluminium roller the surface of which is coated with 1 mm thick silicon rubber having a hardness of 70 degrees, and the surface of the transfer roller 11a is maintained at a temperature of 90° to 100° C. by a built-in 800 W halogen heater 11c.

The pressure roller 11b is also an aluminium roller the surface of which is coated with 1 mm thick silicon rubber having a hardness of 70 degrees. The level of its pressure with respect to the transfer roller 11a is set to 6 to 7 kg f/cm by pressure means such as a spring (not shown).

Furthermore, recording sheets 15 as a recording medium are stored in a cassette 14 in a stacked manner. The recording sheets 15 are sequentially fed out of the cassette 14 by means of a sheet feed roller 16 and a pair of register or registration rollers 17a and 17b, being transported in synchronism with the motion of the transfer recording medium 1 in such a manner as to be superposed on the area of the trasfer recording medium 1 in which an image is formed.

The following description refers to the recording operation of the recording system having the above-described arrangement.

When a motor (not shown) is energized, the transfer recording medium 8 is sequentially fed out of the supply roll 9 by the driving motion of the motor. In the recoding section 10, light and heat are applied to the transfer recording layer 8b of the transfer recording medium 8 in response to an image signal, so that an image is formed on the transfer recording layer 8b.

By way of illustration, the following example is arranged in such a manner that heat is applied in response to the image signal with light being uniformly applied.

More specifically, the nature of the transfer recording layer 8b is such that, when both heat and light having a predetermined wavelength are applied to the layer 8b, the softening point is raised, so that no transfer onto the recording sheet 15 takes place.

Figure 6:
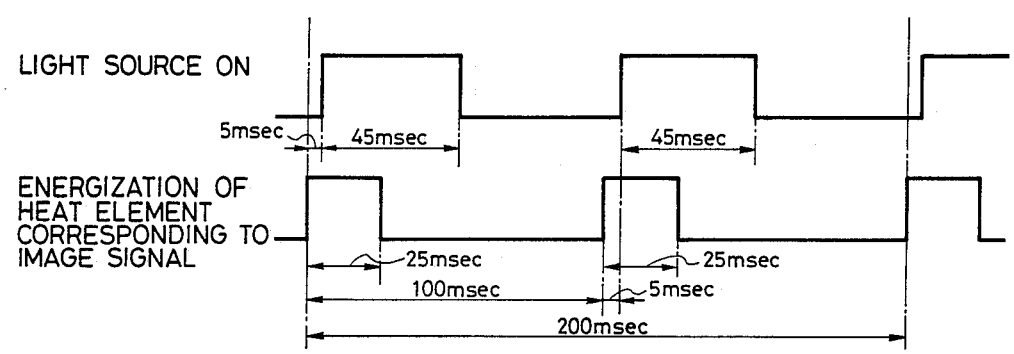
FIG. 6 is a timing chart showing the relationship between the applications of heat and light.

Therefore, as shown in a timing chart of FIG. 6, at the time of recording of magenta, the heat elements of the heat element array 10b corresponding to an image signal representing magenta is not energized while the portion corresponding to an image signal representing white is energized for 25 ms (it is assumed in this example that the recording sheet 15 is white.) With a time lag of 5 ms, the transfer recording medium 8 is uniformly illuminated by light having a spectral distribution A shown in FIG. 2. The period required for this illumination is 45 ms.

Next, the case of blue recording is explained. When 50 ms elapses after completion of the aforesaid illumination, that is, 100 ms after commencement of the aforesaid energization, the portion of the heat element array 10b corresponding to an image signal representing white is energized for 25 ms without energizing the heat elements corresponding to an image signal representing blue. At 5 ms after this energization, the transfer recording medium 8 is uniformly illuminated by light having a spectral distribution B shown in FIG. 2. The period required for this illumination is the same as the above-described 45 ms.

The following description concerns the operation of alternate application of the respective waves having the spectral distributions A and B shown in FIG. 2 to the transfer recording medium 8 at the above-discribed timing.

When the rotary member 1 of the illumination apparatus L shown in FIG. 1 is rotated at a constant speed of 75 rpm, the respective fluorescent substances A and B alternately assume face-to-face relationship with the transfer recording medium 8 via the slit 3 and the lens 4 with a period of 100 ms. Therefore, when the light source 2 is turned on in accordance with the timing chart shown in FIG. 6 (the light source is turned on and off at an interval of 100 ms in the timing chart shown in FIG. 6), the rotation of the rotary member 1 is phase-controlled so that the light emitted from either of the fluorescent substances A or B may illuminate the transfer recording layer 8b via the slit 3 and the lens 4. In consequence, in the case of magenta recording, light having the spectral distribution A shown in FIG. 2 illuminates the transfer recording layer 8b while, in the case of blue recording, light having the spectral distribution B shown in FIG. 2 illuminates the same.

Figure 7:
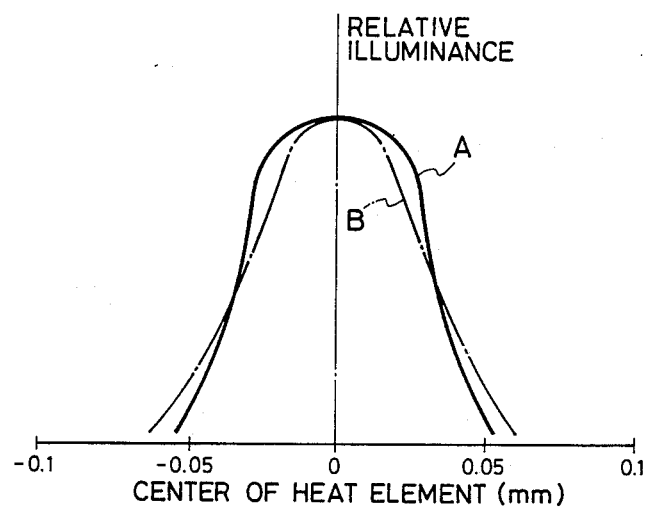
FIG. 7 is a chart showing the illuminance distribution when the transfer recording medium is illuminated by the illumination apparatus shown in FIG. 1.
Figure 8:
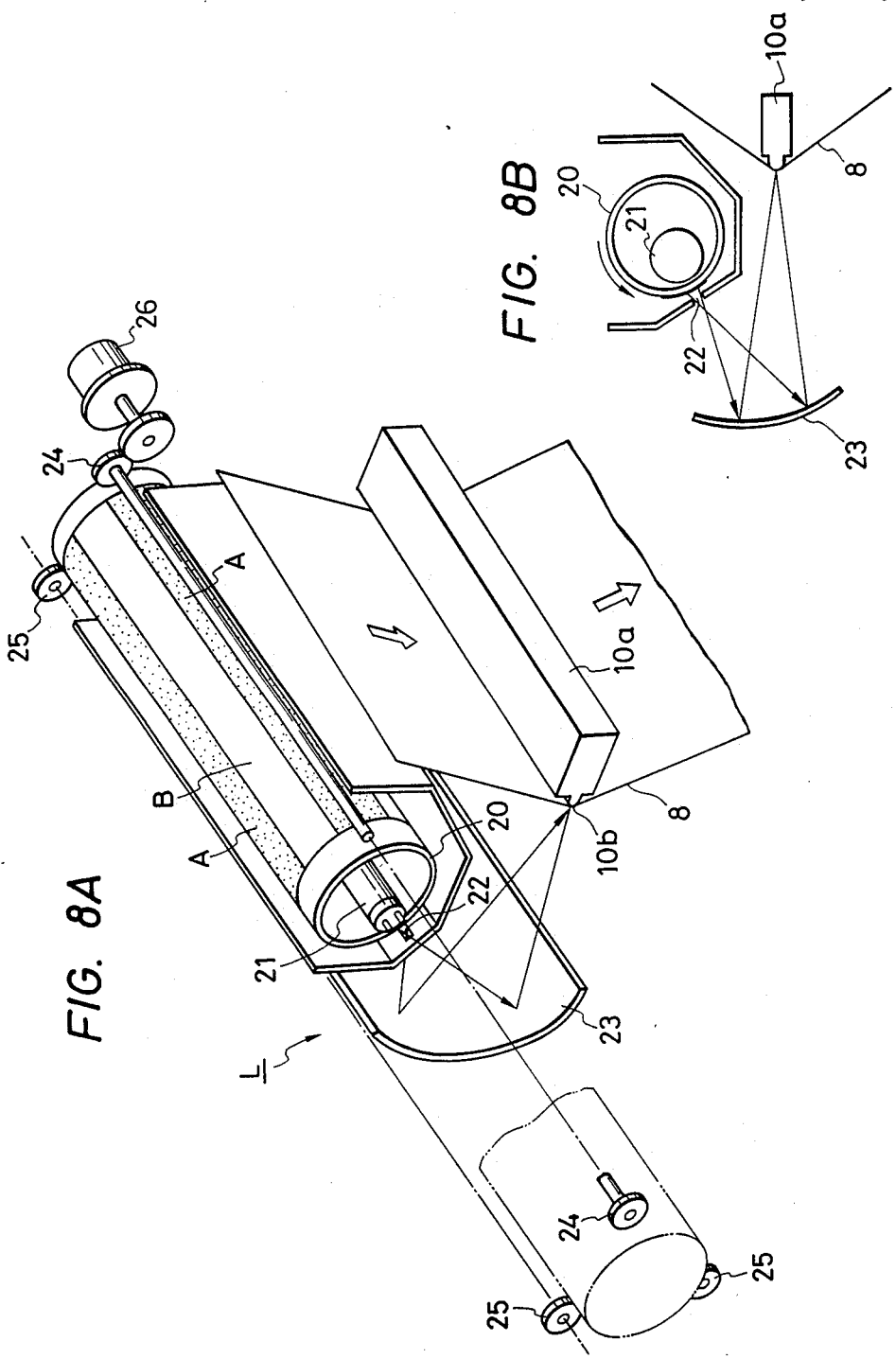
FIGS. 8A, 8B and 9 are schematic views respectively showing modifications of the first preferred embodiment of the illumination apparatus.

As described previously, the light emitted from the respective fluorescent substances A and B is passed through the slit 3 and is focused on the transfer recording layer 8b by the lens 4, thereby making the illumination width extremely narrow. In this embodiment, as shown in FIG. 7, the illumination width covers a range of about 60 μm on each side of the center line of the heat element array 10b. Accordingly, the illumination width is limited to the area of the transfer recording medium 8b which is heated by the heat elements.

Incidentally, in FIG. 7, there is a discrepancy between the illumination distributions of the light emitted from the fluorescent substances A and B. This is because the chromatic abberation of the lens 4 influences the respective wavelengths which differ from each other.

In the above-described manner, the recording head 10a is controlled in response to respective image signals representing magenta, blue and white and at the same time the transfer recording layer 8b is illuminated with light having a predetermined wavelength, thereby transferring an image thereon. The transfer recording medium 8 is transported in synchronism with a repetition cycle of 200 ms/line. In the transfer section 11, the transfer recording layer 8b having the thus-transferred image is heat-pressed against the recording sheet 15, thereby forming an transferred image composed of blue and magenta on the recording sheet 15. Subsequently, the transfer recording medium 8 is separated from the recording sheet 15 by the release roller 12, and the recording sheet 15 having an image recorded in desired color is discharged into a delivery tray 18.

As described above, two-color recording is effected by one shot.

FIG. 8A is a perspective view of a modification of the first preferred embodiment of the illumination apparatus L of the present invention with FIG. 8B showing the optional path of illuminating light.

In this modification, a light source is accommodated in the interior of a rotary member. The construction thereof will be described later. A cylindrical rotary member 20 is made of quartz glass, and its surface is coated with two kinds of fluorescent substances A and B in the longitudinally striped manner, the respective substances A and B being composed of the same compositions as those used for the rotary member shown in FIG. 1. The rotary member 20 has a light source constituted by the built-in germicidal lamp GL-10, and the light emitted from the light source 21 causes excited emission of the fluorescent substances A and B. The excited light passes through a slit 22, reflected and converged by a reflection mirror 23, and thereby illuminating the transfer recording medium 8 as a subject.

One driving roller 24 and two driven rollers 25 are maintained in contact with each of the end portions of the rotary member 20 so as to rotatably support the member 20. The rotary member 20 is adapted to be rotated about its axis at a predetermined speed by the rotation of the driving roller 24 driven by a servo motor 26.

Therefore, if the illumination apparatus L having the above-described arrangement is incorporated into the previously-described recording system, the rotary member 20 being rotated at a predetermined speed and at the same time the light source 21 being turned on and off in synchronism with a recording speed, it is possible to achieve the same effect as that of the above-described first embodiment.

It is to be noted that in the modification shown in FIG. 8A the inner surface of the rotary member 20 maybe coated with the fluorescent substances A and B.

As a matter of course, the image formation may also be performed by means of a lens system instead of the reflection mirror 23.

Figure 9:
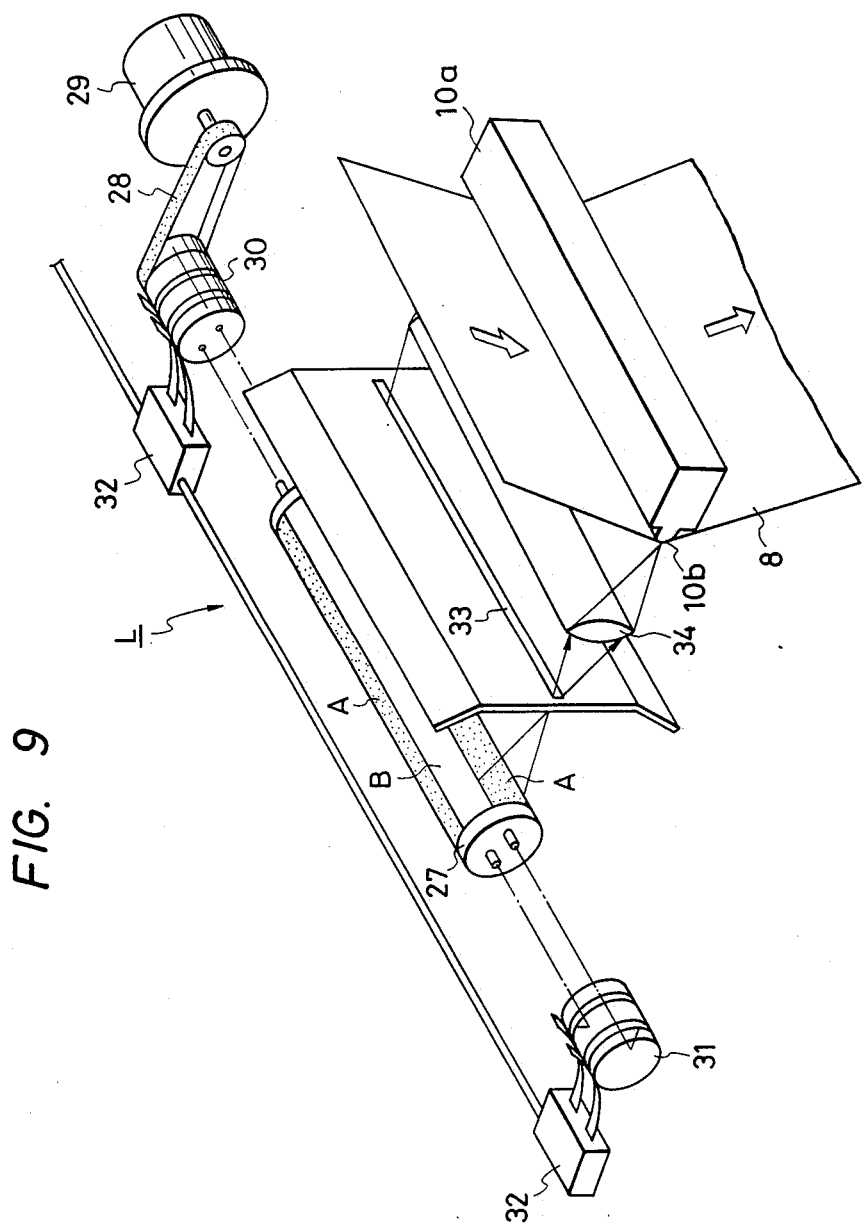

FIG. 9 shows another modification of the first preferred embodiment of the illumination apparatus L in accordance with the present invention. As shown, a light source 27 per se has an outer surface coated with the fluorescent substances A and B. The light source 27 has at one end a lamp socket 30 with a pulley coupled with a servo motor 29 via a timing belt 28 and at the other end a socket 31 having slip rings. The respective sockets 30 and 31 are rotatably supported by bearings (not shown) and are arranged to be kept in contact with each electrode 32 made of leaf springs. Therefore, even while the light source 27 is being rotated about its axis, it can be turned on by electric power supplied through the electrodes 32.

The aforesaid light source 27 is caused to rotate at a predetermined speed by the motor 29, and the light emitted from the excited fluorescent substances A and B is focused on the transfer recording medium 8 through a slit 33 and a lens 34 as is the case with the first preferred embodiment shown in FIG. 1. This makes is possible to achieve the same effect as that of the first embodiment.

It will be appreciated that, although two kinds of fluorescent substances are used in the above-described embodiment, the number of kinds may be altered as occasion demands.

Moreover, the construction of the rotary member is not limited to the above-described glass-tube or drum-like structure. For example, it may have a structure like a belt passed between pulleys or a disc-lie shape.

In the above-described embodiment, the germicidal lamp is used as means for causing emission of the fluorescent substances. However, an LED array, a xenon lamp or a device for generating X-ray or electron beams could be suitably utilized to obtain light having a desired wavelength in relation to the fluorescent substances employed.

The following description refers to another example of the recording system incorporating the above-described illumination apparatus.

In the previously-described example of the recording system, the recording section 10 is arranged in such a manner that the transfer recording layer 8b of the transfer recording medium 8 is uniformly illuminated with light having a predetermined wavelength corresponding to desired color and at the same time heat is applied to the carrier 8 in response to an image signal. However, the recording section 10 may be arranged in such a manner that, while the heat is uniformly applied to the carrier 8, the light having a predetermined wavelength is applied to the layer 8b in response to the image signal.

If the carrier 8a is made of a transmission type material, the recording section 10 may be arranged in such a manner that the carrier 8a is illuminated with light while heat is being applied to the transfer recording layer 8b.

Furthermore, in the above-described embodiment, illumination is performed on one side of the carrier 8a with heating on the other side thereof for the purpose of image formation. However, both illumination and heating may be performed on the same side of the carrier 8a for this purpose.

In the above-described embodiment, the carrier 8a is made of polyethylene telephthalate. However, it is also suitable to use other materials such as polyamide, polyimide, capacitor paper and cellophane paper.

Although the recording head 10a is used as a heating means, a YAG laser and a polygon mirror may be used in combination so as to perform selective heating.

Furthermore, the kind of recording medium is not limited solely to the above-described type of recording paper. As another example, a plastic sheet for use with an overhead projector (OHP) can be utilized without any problem.

In the previously-described embodiment, light energy and heat energy are imparted to the transfer recording layer 8b at the same time. However, both the energies may be separately applied inasmuch as they are finally imparted to the layer 8b.

The above description refers to a two-color recording system by way of example. As a matter of course, it is possible to obtain not only three or more kinds recording but also multi-color recording by suitably selecting the kinds of coloring agent and light starting agent, both of which form image forming elements, and the kind of fluorescent substance for emitting light having a wavelength to cause the reaction of the light starting agent.

In addition, the above description refers to an example in which an image is transferred and recorded on the recording medium by applying light and heat energies so as to alter the softening temperature of the transfer recording layer 8b made of a polymer material including a coloring agent. However, it is also preferable to transfer an image using the adhesion characteristics of the material with respect to the recording medium or a difference between the sublimation characteristics of the material and the recording medium. Alternatively, coloring power could be imparted to the recording medium, and the transfer recording medium may be coated with a layer capable of altering the coloring characteristics of the recording medium. It is thus possible to obtain a recorded image by transferring onto the recording medium an image formed on the transfer recording medium.

In the transfer section 11, use of the transfer roller 11a and the pressure roller 11b is only illustrative. It is also suitable to use a rotating belt or any other arrangement of the type capable of providing a desired level of pressure.

The previously-described example of the recording system illustratively employs a transfer recording medium of the type that has transfer characteristics altered by the application of both light energy and heat energy. However, the aforesaid illumination apparatus L can be suitably used as illumination means in another type of recording system as well, for example, the type in which a transfer recording medium made of a photosensitive material is illuminated with light in response to image information so as to form a latent image thereon, the latent image being transferred onto a recording sheet in a transfer section.

As described above in detail, the first preferred embodiment is arranged in such a manner that the rotary member having two or more kinds of flourescent substances is rotated about its axis, the light emitted from the fluorescent substances being made to illuminate the subject. This enables light having a plurality of spectral characteristics to positively illuminate a confined area of the subject.

Figure 10A:
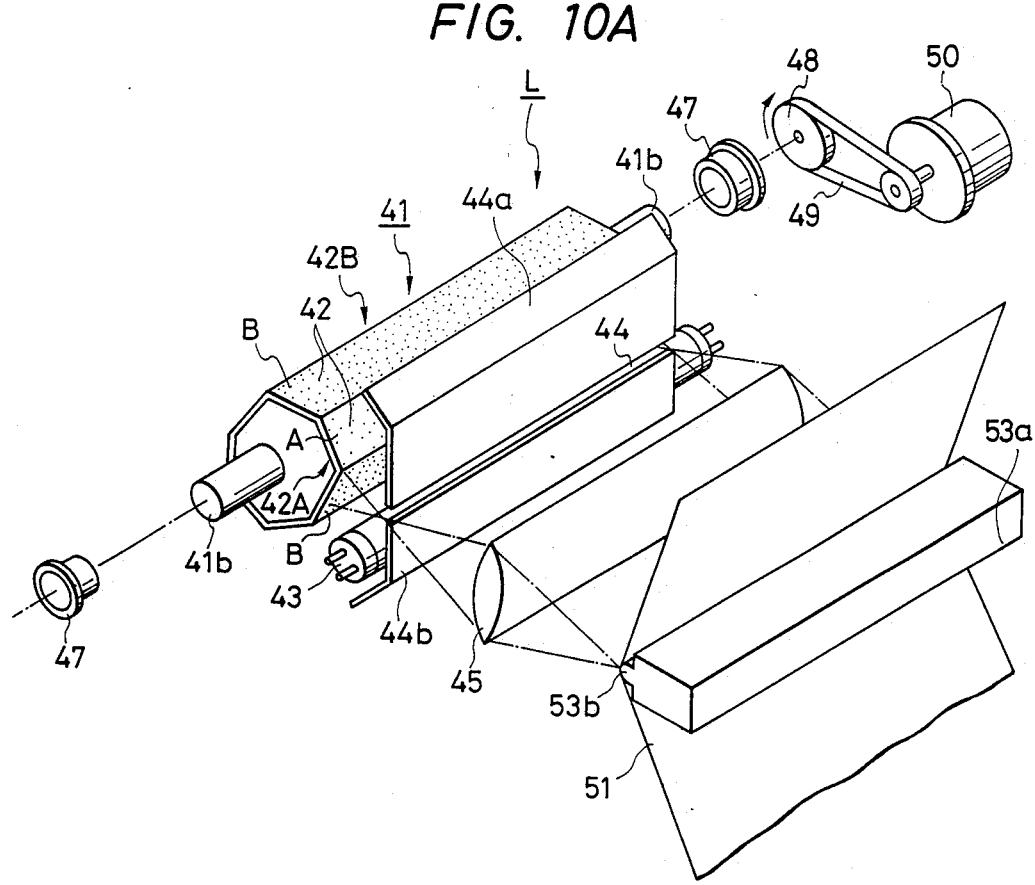
FIGS. 10A and 10B are respectively schematic views showing, in perspective, a second preferred embodiment of the illumination apparatus in accordance with the present invention.
Figure 10B:
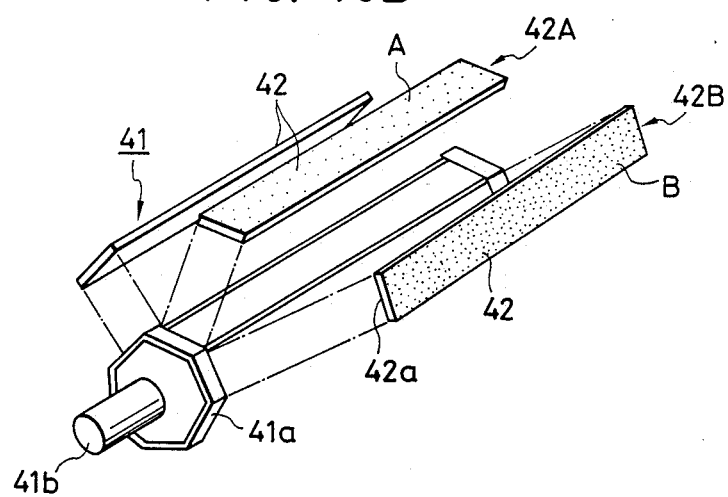

FIGS. 10A and 10B are respectively perspective views of the second embodiment of the illumination apparatus L arranged to emit light having two kinds of spectral characteristics. As shown, a rotary member indicated generally at 41 is formed in the shape of a hexagonal cylinder composed of six elongated-sheet-like fluorescent members 42. The six fluorescent members 42 are fixedly bonded to a cage-type rotary carrier 41a made of aluminum by means of a suitable adhesive.

The respective fluorescent members 42 include elongated substrates 42a the surfaces of which are coated with a fluorescent substance A or B. In the second embodiment, fluorescent members 42A coated with the fluorescent substance A and fluorescent members 42B coated with the fluorescent substances substance B are prepared for use as the fluorescent members 42, the two kinds fluorescent members 42A and 42B being alternately arranged to constitute the rotary member 41. The fluorescent substance A is composed of $(Ca,Zn)_3(PO)_2$ as a base substance and Tl as an activator while the other flourescent substance B is composed of $SrMgP_2O_7$ as a base substance and $Eu^{2+}$ as an activator. A light source 43 is constituted by a germicidal lamp GL-10. The respective fluorescent substances A and B are composed in such a manner that, if the light emitted from the light source 43 causes excited emission of the fluorescent substances A and B, they respectively exhibit the spectral distributions shown in FIG. 11. The substrates 42a of the respective fluorescent members 42 are made of material exhibiting proper transmittance in the wavelength range shown in FIG. 11; in the second embodiment quartz glass is used as such material.

When the light source 43 illuminates the fluorescent substances A and B of the rotary member 41, the fluorescent substances A and B is capable of emitting light. The emitted light passes through a slit 44 and a convex cylindrical lens 45, and is focused on a subject 46 to be illuminated. The slit 44 is 0.5 mm in width, and is defined between the two adjacent edges of slit defining plates 44a and 44b. The light passing through the slit 44 is capable of being converged onto the subject 46 (in this embodiment, a transfer recording medium 51) with an illumination width of 0.125 mm or less through the convex cylindrical lens 45.

The lens 45 is made of quartz glass for the same reason as in the case of the substrate 42a.

Moreover, the rotary member 41 has rotary shafts 41b at its opposite ends and the rotary shafts are rotatably supported by bearings 47. The rotary shaft 41b at one end is coupled with a motor 50 via a pulley 48 and a timing belt 49 so that the rotary member 41 is rotated at a constant speed.

Accordingly, when the rotary member 41 is caused to rotate, the fluorescent substances A and B are alternately excited to emit light by virtue of the light emanating from the light source 43, and the thus-obtained light having different spectral characteristics illuminates the subject 46 through the slit 44 and the lens 45.

As described above, in the second preferred embodiment, the rotary member 41 is prepared by separately manufacturing the fluorescent members 42 and combining them by using a suitable means such as an adhesive.

An example of the recording system incorporating the aforesaid illumination apparatus will be described below with reference to FIGS. 12.

Figures 12, 13:
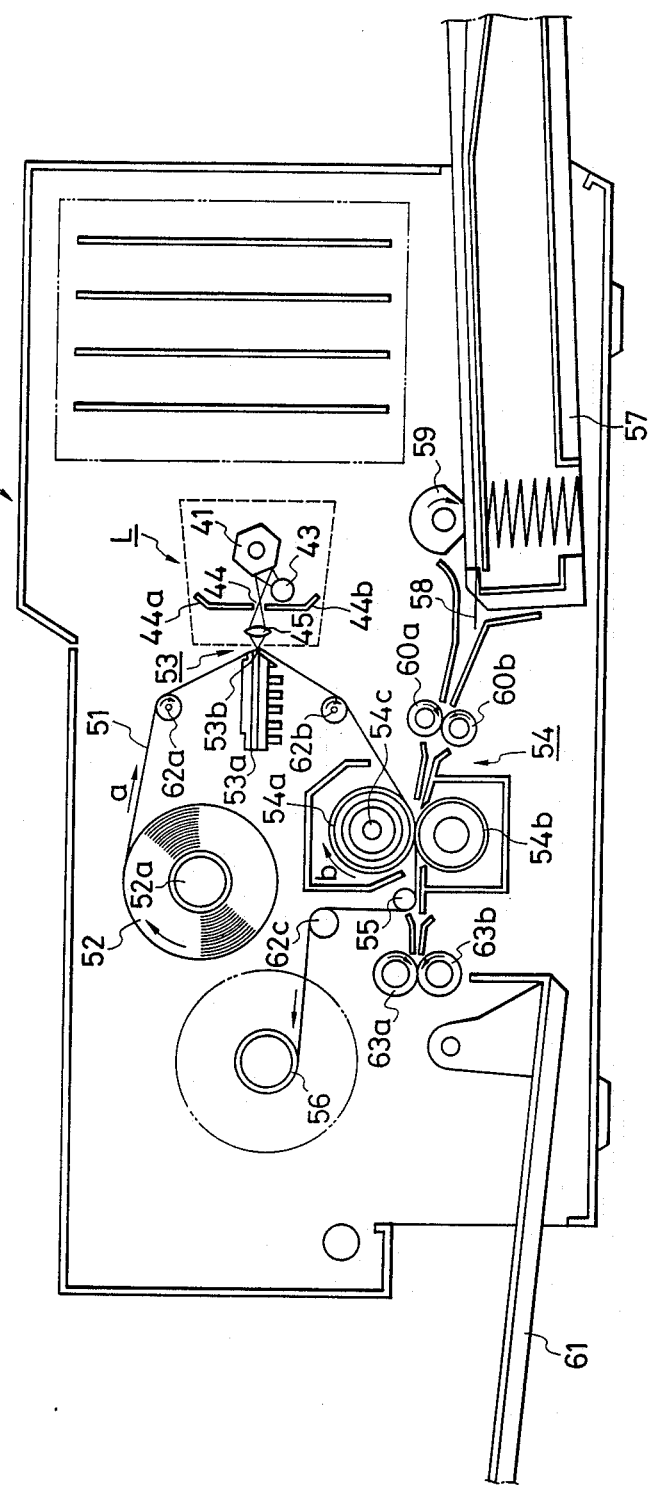
FIG. 12 is a diagrammatic view of an example of a recording apparatus which is constructed having the illumination apparatus shown in FIGS. 10A and 10B.
FIG. 13 is a schematic view used as an aid in explaining the construction of a transfer recording medium used in the second embodiment.

Referring to FIG. 12, a transfer recording medium 51 has an elongated sheet like shape, and is rolled to form a supply roll 52. The supply roll 52 is detachably incorporated into a system body indicated generally at M. More specifically, the supply roll 52 is detachably fitted onto a shaft 52a which is rotatably disposed in the system body M.

The leading end of the transfer recording medium 51 is extracted from the supply roll 52, passed by a guide roller 62a, a recording head 53a and a guide roller 42b, and passed through the nip between a transfer roller 54a and a pressure roller 54b. The leading end is then turned along a release roller 55 and a guide roller 62c, reaching a take-up roll 56, and engaging with a gripper (not shown) of the take-up roll 56. Subsequently, if the take-up roll 56 is driven to rotate by a known type of drive means, the transfer recording medium 51 is supplied in the direction of an arrow a, and is wound up around the take-up roll 56 one sheet after another.

It is to be noted that, during the aforesaid taking-up operation, a constant level of back tension is imparted to the supply roll 52 by, for example, a hysteresis brake (not shown). Therefore, the application of the back tension and the action of the guide rollers 62a and 62b cooperate to transport the transfer recording medium 51 while it is maintained in contact with the recording head 53a at a fixed pressure and angle relative thereto.

The constructions of the aforesaid portions will be individually described below.

As shown in FIG. 13, the transfer recording medium 51 has a sheet-like substrate 51a on which a transfer recording layer 51b is deposited the transfer reacording layer 51b having the property or enabling an image to be formed thereon when subjected to heat energy and light energy at the same time.

An example of the transfer recording layer 51b is described below in detail. As shown in FIG. 13, the layer 51b includes cores 51c and 51d containing the components listed in the previously-described Table 2 as well as Table 3 which will be described later, the respective cores 51c and 51d being formed into microcapsular image forming elements by the method previously described with reference to Table 1 and 2.

layer which was separately hardened was about 0.3 $\mu$m in thickness. Then, microcapsular image forming elements were prepared using the core materials listed in Tables 2 and 3, and the two elements were mixed together in a ratio of 1 : 1. The mixture was sprinkled over the viscous deposited layer, being made to adhere thereto. Subsequently, an extra amount of image forming elements was removed, so that 90% of the image forming elements remained and were disposed as one layer on the deposited layer.

Figure 11:
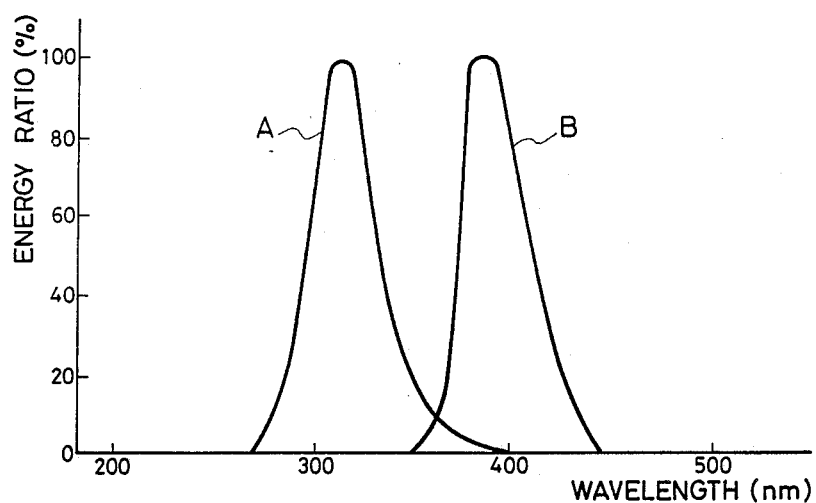
FIG. 11 is a graph showing the characteristics of spectral distribution of emission from fluorescent substances which are coated over a fluorescent member.

The sample obtained in this fashion was placed in a 100° C. environment for about 2 hours until the adhesive 51f was hardened, whereby the transfer recording medium 51 shown in FIG. 11 was prepared.

Figure 14:
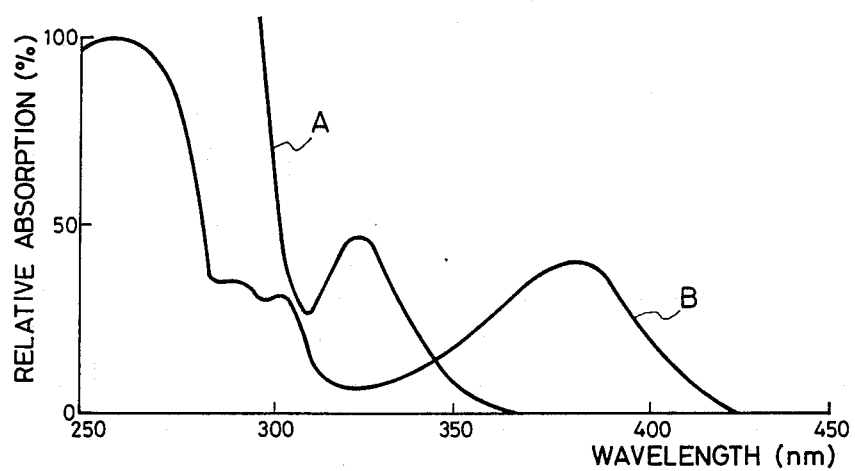
FIG. 14 is a graph showing the absorption characteristics of a light starting agent contained in the transfer recording medium.

Referring to FIG. 14 showing absorption characteristics, the reaction initiator in the imagae forming element shown in Table 3 starts its reaction when absorbing the light in the wavelength range indicated by a curve A, exhibiting magenta in an image formed. On the other hand, the light starting agent shown in Table 2 starts its reaction when absorbing the light in the wavelength range indicated by a curve B (similar to the curve B in FIG. 5), exhibiting blue in an image formed.

It is to be noted that, the heating means, the transfer section and the cassette incorporated in the second embodiment are the same as those of the previously-described embodiment. Therefore, detailed description thereof is omitted for the sake of simplicity.

A register roller pair includes a drive roller 60a and a driven roller 60b. The driving roller 60a is provided with a one-way clutch (not shown) which is rotatable in the direction of transportion of a recording sheet 58. Therefore, while the recording sheet 58 is being transported by a transfer roller 54a and a pressure roller 54b, the register roller pair 60a and 60b is driven to rotate.

The following description concerns the operation of alternate application of the respective waves having the spectral distributions A and B shown in FIG. 11 to the

TABLE 3

| Item | Component | wt % |
|---|---|---|
| Polymerizable Prepolymer | $(CH_2=CHCOOCH_2.CH_2.O.CO.NH-\langle H \rangle_{\overline{n}} CH_2)$ | 70 |
| Reaction initiator | Dichlorobenzophenone/ Ethyl-p-dimethylaminobenzoate | 4/7 |
| Binder | Elvacite 2041 (Manufactured by Dupont) | 17 |
| Coloring Agent | Diaresin Red K (Manufactured by Mitsubishi Chemical Industries, Ltd.) | 2 |

In the second preferred embodiment, the image forming elements are formed in the aforesaid manner by using the compositions listed in Tables 2 and 3.

The thus-produced image forming elements are bonded by an adhesive 51f to the carrier 51a which is a 6 $\mu$m thick polyethylene telephthalate film, thereby obtaining the transfer recoding layer 8b.

In more detail, the adhesive 51f was a two liquid type of epoxy-based adhesive consisting of Epolsion EAI and Epolsion EBI (manufactured by Kanebo NSC Kabushiki Kaisha). Epolsion EAI and Epolsion EBI were mixed together in a ratio of 1 : 1, and were further diluted with water. The thus-diluted liquid was coated on a film, the water contained therein being dried, and a deposited layer being thereby obtained. The deposited layer was viscous after being dried, and the deposited transfer recording medium 51 at the above-described timing.

When the rotary member 41 of the illumination apparatus L shown in FIG. 10 is rotated about its axis at a constant speed of 100 rpm, the respective fluorescent substances A and B alternately assume face-to-face relationship with the transfer recording medium 51 via the slit 44 and the lens 45 with a period of 100 ms. Therefore, when the light source 43 is turned on in accordance with the timing chart shown in FIG. 6 (the light source 43 is turned on and off at an interval of 100 ms in the timing chart shown in FIG. 6), the rotation of the rotary member 41 is phase-controlled so that the light emitted from either of the fluorescent substances A, B may illuminate the transfer recording layer 51b via the slit 44 and the lens 45. In consequence, in the case of magenta recording, the light having the spectral distribution A shown in FIG. 11 illuminates the transfer recording layer 51b while, in the case of blue recording, the light having the spectral distribution B shown in FIG. 11 illuminates the same.

As described previously, the light emitted from the respective fluorescent substances A and B is passed through the slit 44 and is focused on the transfer recording layer 51b by the lens 45, thereby making the illumination width extremely narrow. In this embodiment, as shown in FIG. 7, the illumination width covers a range of about 60 $\mu$m on each side of the center line of the heat element array 10b. Accordingly, the illumination width is limited to the area of the transfer recording medium 51b which is heated by the heat elements.

In the above-described manner, the recording head 53a is controlled in response to respective image signals representing magenta, blue and white and at the same time the transfer recording layer 51b is illuminated with light having a predetermined wavelength, thereby transferring an image thereon. The transfer recording medium 51 is transported in synchronism with a repetition cycle of 200 ms/line. In the transfer section 54, the transfer recording layer 51b having the thus-transferred image is heat-pressed against the recording sheet 58, thereby forming an transferred image composed of blue and magenta on the recording sheet 58. Subsequently, the transfer recording medium 51 is separated from the recording sheet 58 by the release roller 55, and the recording sheet 58 having an image recorded in desired color is discharged into a delivery tray 68 by the motion of a pair of delivery rollers 63a and 63b.

As described above, two-color recording is effected by one shot.

FIG. 15A is a perspective view of a modification of the illumination apparatus L of the present invention with FIG. 15B showing the optical path of illuminating light.

FIG. 15A is a perspective view of a modification of the illumination apparatus L of the present invention with FIG. 15B showing the optical path of illuminating light.

In this modification, a light source is accommodated in the interior of the rotary member. The construction thereof will be described later. Two kinds of fluorescent members 42 are alternately arranged to form a cylindrical rotary member indicated generally at 41, the respective fluorescent members 42 being coated with either of the fluorescent substances A, B, each having the same composition as that used for the rotary member shown in FIG. 10. The rotary member 41 has a light source 43 constituted by the built-in germicidal lamp GL-10, and the light emitted from the light source 43 causes excited emission of the fluorescent substances A and B. The excited light passes through the slit 64, reflected and converged by the reflection mirror 65, and thereby illuminating the transfer recording medium 51 as a subject.

One driving roller 66 and two driven rollers 67 are maintained in contact with each of the end portions of the rotary member 41 so as to rotatably support the member 41. The rotary member 41 is adapted to be rotated at a predetermined speed by the rotation of the driving roller 66 which is driven by a servo motor 68.

Therefore, if the illumination apparatus L having the above-described arrangement is incorporated into the recording system shown in FIG. 13, the rotary member 41 being rotated at a predetermined speed and at the same time the light source 43 being turned on and off in synchronism with a recording speed, it is possible to achieve the same effect as that of the previously-described embodiments.

It is to be noted that in the modification shown in FIG. 15, the reverse side of the rotary member 20 may be coated with either of the fluorescent substances A, B. As a matter of course, the image formation may also be performed by means of a lens system instead of the reflection mirror.

The above description of the modification refers to use of two kinds of the fluorescent substances A and B by way of example. However, as a matter of course, the number of kinds can be altered as occasion demands.

Furthermore, in the above-described modification, one surface of each of the fluorescent members is coated with the same kind of fluorescent substance. However, the same surfaces of the respective fluorescent members may be coated with a plurality of kinds of fluorescent substances.

The transfer recording layer 51b may be made of a suitably selected material having a nature such as heat fusibility, heat softening properties or heat sublimability.

As occasion demands, the fixing means for fixing an image transferred onto the recording medium in the transfer section 54 could also be disposed downstream of the release roller 55 in the direction in which the recording medium is transported.

The previously-described example of the recording system illustratively employs a transfer recording medium of the type that has transfer characteristics altered by the application of both light energy and heat energy. However, the aforesaid illumination apparatus L can also be suitably used as illumination means in another type of recording system, for example, the type in which a transfer recording medium made of a photosensitive material is illuminated with light in response to image information so as to form a latent image thereon, the latent image being transferred onto a recording sheet in a transfer section.

As described above, in the respective embodiments, a plurality of separately manufactured fluorescent members may be bonded to each other to form the rotary member. Accordingly, the rotary member uniformly coated with a predermined kind of fluorescent substance can be easily produced with high precision, and this enables stable illumination.

Figure 17:
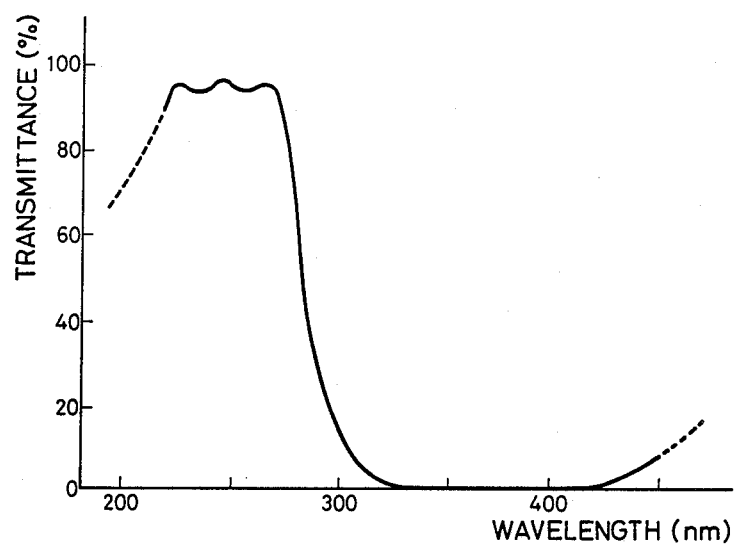
FIG. 17 is a graph showing the transmission characteristics of the wavelength selective transmission layer used in the second preferred embodiment.
Figure 18:
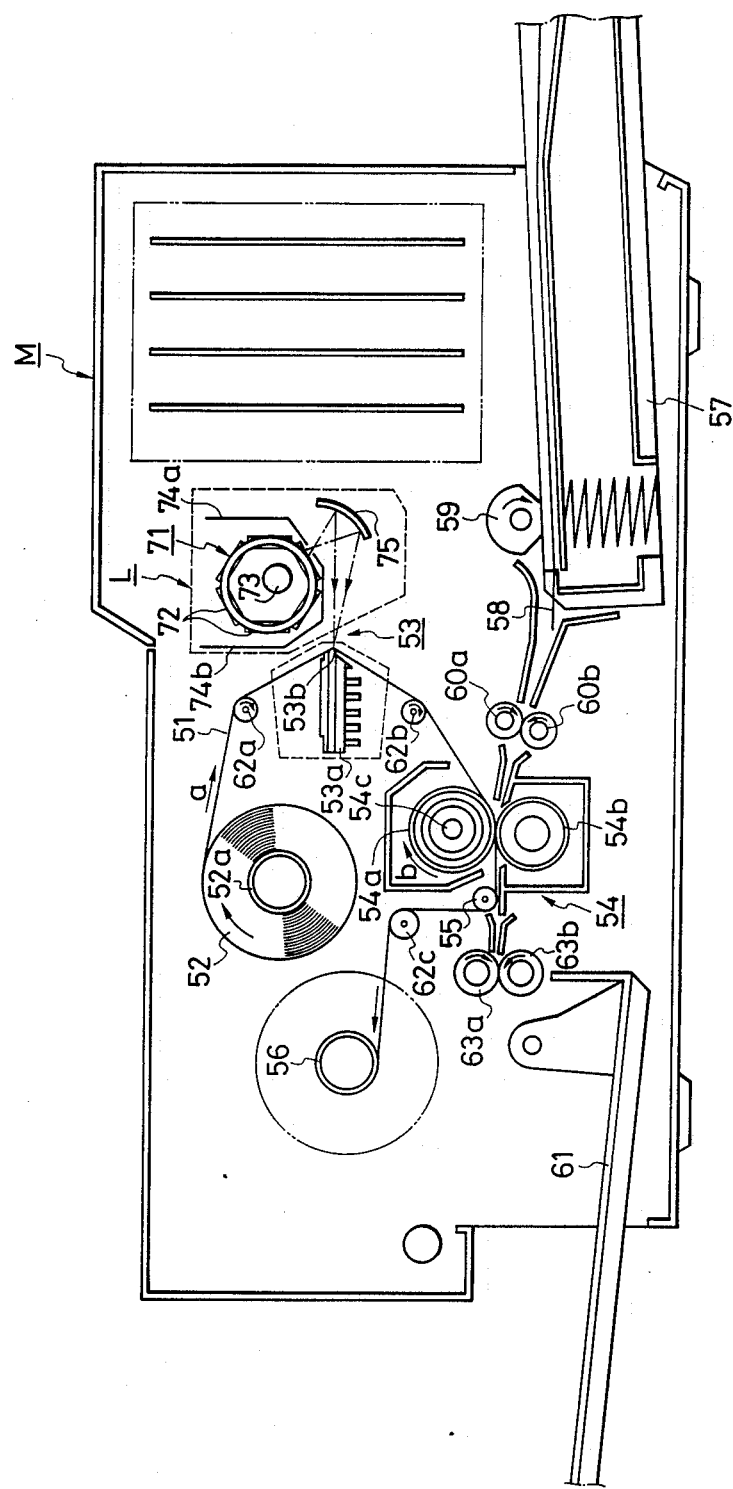
FIG. 18 is a schematic view of the whole of an example of a recording system which is constructed having the illumination apparatus shown in FIG. 16A.

A third preferred embodiment of the illumination apparatus of the present invention will be described below with reference to FIG. 16 to 18.

The preferred embodiment comprises: a rotary member having two kinds of fluorescent substance layer and a wavelength selecting layer for transmitting or reflecting light having a predetermined wavelength; drive means for causing rotation of the rotary member; and excited emission means for causing excited emission of the aforesaid fluorescent substances, the wavelength selecting layer being formed between the fluorescent substance layer and the excited emission means for illumination purposes. A recording system employing the aforesaid third embodiment is arranged in such a manner that the illumination apparatus imparts light energy to a member on which an image is to be formed, thereby transferring an image onto the recording medium and forming the image thereon.

In this arrangement, light having a wavelength that makes it unnecessary for excited emission of the fluorescent substances, or light that would be harmful to a subject to be illuminated, is eliminated from the light emitted through the wavelength selecting layer from the light emitting means, light having a predetermined wavelength causing emission of the fluorescent substance layer, and the thus-emitted light illuminating the subject to be illuminated. During this time, when the rotary member made of a combination of the two or more kinds of fluorescent substances is rotated about its axis, light having a plurality of spectral characteristics illuminates the subject from substantially the same position on the rotary member. Therefore, if the aforesaid illuminating light is made to pass through a slit or other suitable means, it is possible to cast light having a plurality of spectral characteristics exactly on an extremely narrow area of the subject.

The third preferred embodiment will be described below in further detail.

FIGS. 16A and 16B are respectively perspective views of the illumination apparatus L arranged to emit light having two kinds of spectral characteristics.

As shown, the rotary member indicated generally at 71 is formed in the shape of a hexagonal cylinder composed of six elongated sheet like fluorescent members 72. The six fluorescent members 72 are fixedly bonded to a cage-type rotary carrier 71a made of aluminium by means of a suitable adhesive.

The respective fluorescent members 72 include elongated substrates 72a each having one surface coated with a fluorescent substance layer 72b and the opposite surface coated with a wavelength selective transmission layer 72c. In the third embodiment, two kinds of fluorescent substances A and B are prepared for use as the fluorescent substance layer 72b, one group of fluorescent plates being coated with the fluorescent substance A with the other group of fluorescent plates being coated with the fluorescent substance B, and the two kinds of fluorescent plates being alternately arranged to constitute the rotary member 71 in combination. The fluorescent substance layer 72b is formed on the outer surface of the rotary member 71 with the wavelength selective transmission layer 72c being formed on the inner surface thereof.

The fluorescent substance A is composed of $(Ca,Zn)_3(PO)_2$ as a base substance and Tl as an activator while the other fluorescent substance B is composed of $SrMgP_2O_7$ as a base substance and $Eu^{2+}$ as an activator. A light source 73 is constituted by a germicidal lamp GL-10 provided in the interior of the rotary member 71. The respective fluorescent substances A and B are composed in such a manner that, if the light emitted from the light source 73 causes excited emission of the fluorescent substances A and 8, they respectively exhibit the spectral distributions shown in FIG. 11. The substrates 72a of the respective fluorescent plates 72 are made of material exhibiting proper transmittance in the wavelength range shown in FIG. 11; in the third embodiment quartz glass is used as such material. The wavelength selective transmission layer 72c is made of material which transmits or reflects only light having a predetermined wavelength. In the third embodiment, as shown in FIG. 17, a filter having a multiple layer of oxidized metal $Al_2O_3$, $SiO_2$ or the like formed on the quartz glass surface is employed to cut off light in the wavelength range of 300 nm or more, but to transmit light below 300 nm, in particular light corresponding to the 254 nm wavelength.

When the light source 73 illuminates the fluorescent substances A and B of the rotary member 71, the fluorescent substances A and B emits light. The light thus emitted is passed through a slit 74, reflected by a reflection mirror 75, and focusing on a subject 76 to be illuminated. The slit 74 is 0.5 mm in width, and is defined between the two adjacent edged of slit defining plates 74a and 74b. The light passing through the slit 74 is capable of being converged onto the subject 76 with an illumination width of 0.125 mm or less by the reflection mirror 75.

One driving roller 77 and two driven rollers 78 are maintained in contact with each of the end portions of the rotary member 71 so as to rotatably support the member 71. The driving force of a motor 79 is transmitted through a pressure roller 80 to the associated driving roller 77 to cause the roller 77 to rotate at a predetermined speed, so that this cause rotation of the rotary member 71 about its axis.

When the rotary member 71 is caused to rotate about its axis, the fluorescent substances A and B are alternately excited to emit light by virtue of the light emanating from the light source 73, and the thus-obtained light having different spectral characteristics illuminates the subject 76 through the slit 74 and the reflection mirror 75. During this time, light having a predetermined wavelength, in particular light corresponding to the wavelength of 254 nm is selectively transmitted through the wavelength selective transmission layer 72c, and the thus-transmitted light causes excited transmission of the fluorescent substances A and B. In other words, the layer 72c transmits only light having a wavelength required for excited emission of the fluorescent substances A and B.

As described above, in the third preferred embodiment, the rotary member 71 is prepared by separately manufacturing the fluorescent plates 72 and combining them by using a suitable means such as an adhesive or screws. Therefore, it is possible to exactly adjust the amount of fluorescent substances to be coated.

An example of the recording system incorporating the aforesaid illumination apparatus L will be described below with reference to FIGS. 18. In the third embodiment, like reference numerals are used to denote the like or corresponding elements which constitute each of the components shown in the above-described respective embodiments, and detailed description is omitted for the sake of simplicity.

The following description concerns the operation of alternate application of the respective waves having the spectral distributions A and B shown in FIG. 11 to the transfer recording medium 51 at the previously-described timing.

When the rotary member 71 of the illumination apparatus L shown in FIG. 16 is rotated about its axis at a constant speed of 100 rpm, the respective fluorescent substances A and B alternately assume face-to-face relationship with the transfer recording medium 51 via the slit 74 and the reflection mirror 75 with a period of 100 ms. Therefore, when the light source 73 is turned on in accordance with the timing chart shown in FIG. 6 (the light source is turned on and off at an interval of 100 ms in the timing chart shown in FIG. 6), the rotation of the rotary member 71 is phase-controlled so that the light emitted from either of the fluorescent substances A, B may illuminate the transfer recording layer 51b via the slit 74 and the reflection mirror 75. In consequence, in the case of magenta recording, light having the spectral distribution A shown in FIG. 11 illuminates the transfer recording layer 51b while, in the case of blue recording, light having the spectral distribution B shown in FIG. 11 illuminates the same.

In the above-described state, the light emitted from the light source 73 having the wavelength having 300 nm or less, in particular ultraviolet rays corresponding to 254 nm is transmitted through the wavelength selective transmission layer 72c, and the ultraviolet rays cause excited emission of the fluorescent substances. It follows that only the light required for causing the reaction of the transfer recording layer 51b illuminates the layer 51b, and the light harmful to such reaction is eliminated.

As described previously, the respective waves emitted from the fluorescent substances A and B are passed through the slit 74, reflected by the reflection mirror 75 and formed on the transfer recording layer 51b, thereby making the illumination width extremely narrow. In this embodiment, as shown in FIG. 7, the illumination width covers a range of about 60 μm on each side of the center line of the heat element array 53b. Accordingly, the illumination width is limited to the area of the transfer recording layer 51b which is heated by the heat elements.

In the above-described manner, the recording head 53a is controlled in response to respective image signals representing magenta, blue and white and at the same time the transfer recording layer 51b is illuminated with light having a predetermined wavelength, thereby forming a negative image on the transfer recording layer 51b while controlling a head 53b. A transfer recording medium 51 is transported in synchronism with a repetition cycle of 200 ms/line. In a transfer section 54, the transfer recording layer 51b having the thus-transferred image is heat-pressed against a recording sheet 58, thereby forming an transferred image composed of blue and magenta on the recording sheet 58. Subsequently, the transfer recording medium 58 is separated from the recording sheet 58 by the release roller 55, and the recording sheet 58 having an image recorded in desired color is discharged into the delivery tray 61 through a pair of delivery rollers 63a and 63b.

As described above, two-color recording is effected by one shot.

In the above-described embodiment, while the light passing through the slit 74 is focused on the subject by the reflection mirror 75, a lens may be substituted for the reflection mirror 75 to focus the light thereon.

It will be appreciated that, although two kinds of fluorescent substances A and B are used in the above-described embodiment, two or more kinds of fluorescent substance may be used, and the number of kinds could be altered as occasion demands.

In addition, it is also possible to alter the wavelength of light for causing excited emission of the fluorescent substances A and B by varying the material of the wavelength selective transmission layer 72c.

As described above, the third preferred embodiment is arranged in such a manner that the wavelength selective transmission layer formed on the rotary element allows for utilization of light required for excited emission of the fluorescent substances alone, thereby enabling elimination of unwanted or harmful light.

Moreover, if the aforesaid illuminating apparatus is used to constitute the recording system in which the transfer recording medium is illuminated with light, it is possible to cast light in units of extremely narrow width. This enables elimination of harmful light, thereby obtaining a high quality image free from picture noise at high speed.

The fourth preferred embodiment will be described with reference to FIGS. 19 to 23.

The fourth embodiment of the illumination apparatus which will be described later comprises: a rotary member having alternately arranged fluorescent and non-fluorescent substance areas; driving means for causing rotation of the rotary member; and means for causing emission of the fluorescent substances, illumination being thereby performed. The recording system employing the embodiment is arranged in such a manner that the aforesaid illumination apparatus is used to impart light energy to a member on which an image is formed, so that the image is transferred onto a recording medium.

In the aforementioned arrangement, the light emitted from the fluorescent substances illuminates the subject. During this time, if the rotary member having the alternately arranged fluorescent and non-fluorescent areas is rotated about its axis at a constant speed, the subject is illuminated with light having a predetermined wavelength at predetermined intervals even in a state wherein the light source in ON. Also, if a plurality of fluorescent substance having different spectral characteristics are formed on the rotary member, the subject is then illuminated with light having a plurality of spectral distributions in a high-speed switched over manner.

Figure 19:
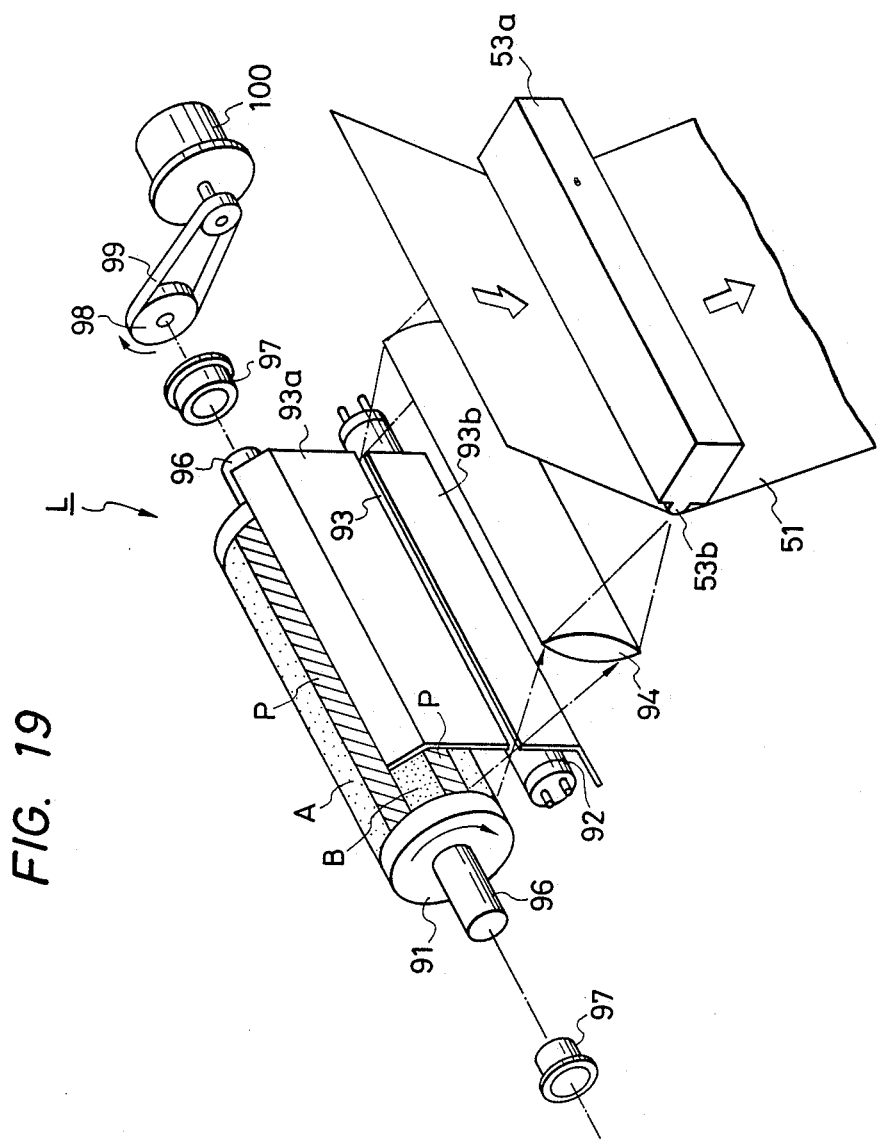
FIG. 19 is a schematic perspective view of a fourth preferred embodiment of the illumination apparatus in accordance with the present invention.

FIG. 19 is a perspective view of the illumination apparatus L capable of emitting light having two kinds of spectral characteristics.

In FIG. 19, a rotary member indicated generally at 91 is made of an aluminium cylinder, and its surface is coated with two kinds of fluorescent substances A and B in a longitudinally striped manner, the substance A being composed of $(Ca,Zn)_3(PO)_2$ as a substrate and Ti as an activator while the substance B being composed of $SrMgP_2O_7$ and $Eu^{2+}$ as an activator. If the light emitted from a light source 92 constituted by a germicidal lamp GL-10 causes excited emission of the respective fluorescent substances A and B, they respectively exhibit the spectral characteristics indicated by the curves A and B shown in FIG. 11. Paint P is commercially available black paint. When the light emitted from the light source 92 is incident on the area painted with the paint P, the incident light is absorbed by the black paint P, so that no emission takes place.

When the light source 92 illuminates the fluorescent substances A and B of a rotary member 91, the fluorescent substances A and B emit light. The light thus emitted passes through a slit 93 and a convex cylindrical lens 94, and is focused on a subject to be illuminated, in this embodiment the transfer recording medium 51. The slit 93 is 0.5 mm in width, and is defined between the two adjacent edges of slit defining plates 93a and 93b. The light passing through the slit 93 is capable of being converged onto the subject 51 with an illumination width of 0.5 mm or less through the convex cylindrical lens 94.

The aforesaid lens 94 is made of material exhibiting proper transmittance in the wavelength range shown in FIG. 11; in this embodiment quartz glass is used as such material.

Moreover, the rotary member 91 has rotary shafts 96 at its opposite ends and the rotary shafts 96 are rotatably supported by bearings 97. The rotary shaft 96 at one end is coupled with a motor 100 via a pulley 98 and a timing belt 99 so that the rotary member 91 is rotated about its axis at a constant speed.

Accordingly, when the rotary member 91 is caused to rotate about its axis, the fluorescent substances A and B are alternately excited to emit light by virtue of the light emanating from the light source 43. On the other hand, when the light illuminates the paint P, the light is absorbed by the paint P, so that no emission takes place. Accordingly, the light emitted from the fluorescent substances A and B alternately illuminates the subject 51 through the slit 93 and the lens 94 intermittently and at constant intervals.

As described above, this embodiment is arranged in such a manner that, when the subject is to be illuminated with light having difference spectral characteristics, the illumination is enabled without the need to use a driver circuit therefor and while the light source 92 is ON. This prolongs the lifetime of the light source 92.

Figure 20:
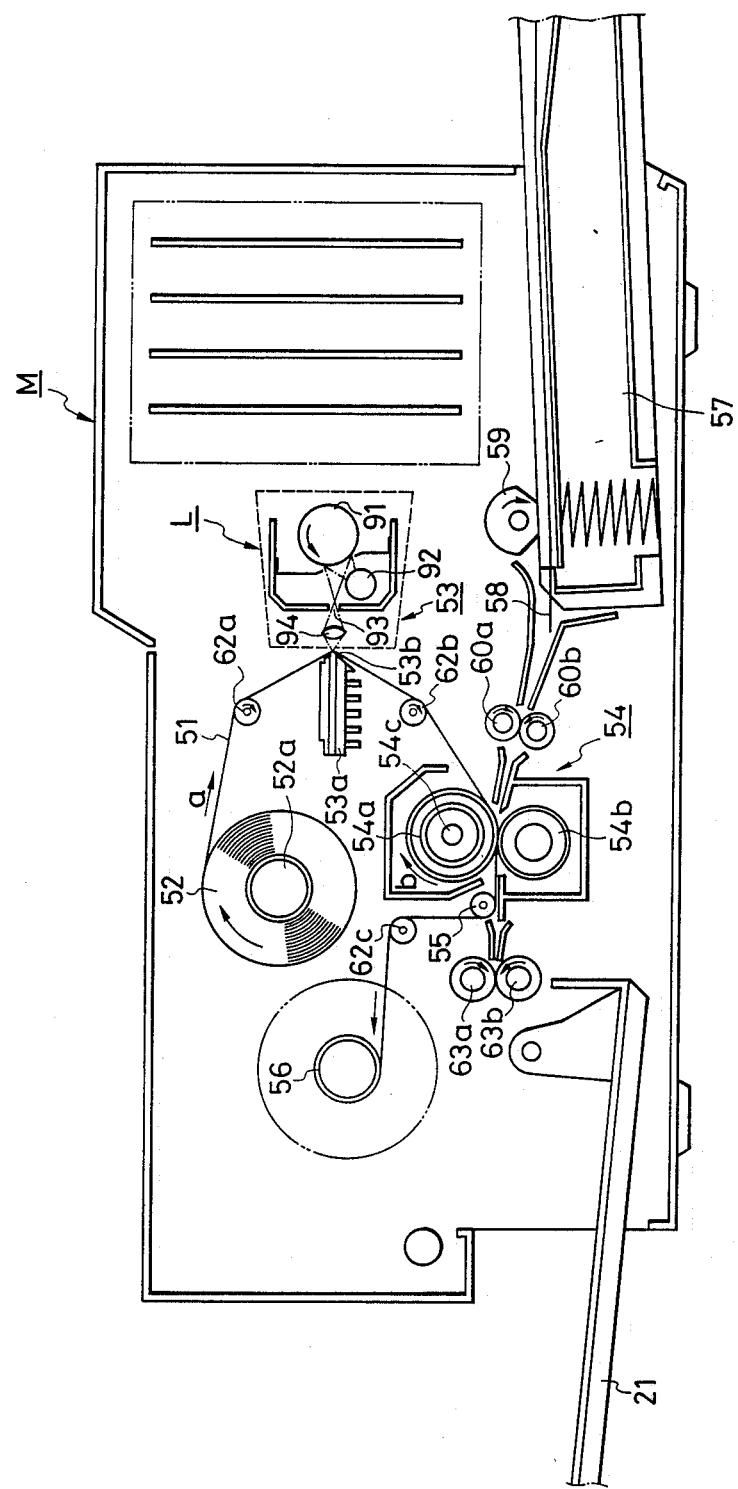
FIG. 20 is a schematic view of an example of a recording system which is constructed having the illumination apparatus shown in FIG. 19.
Figure 21:
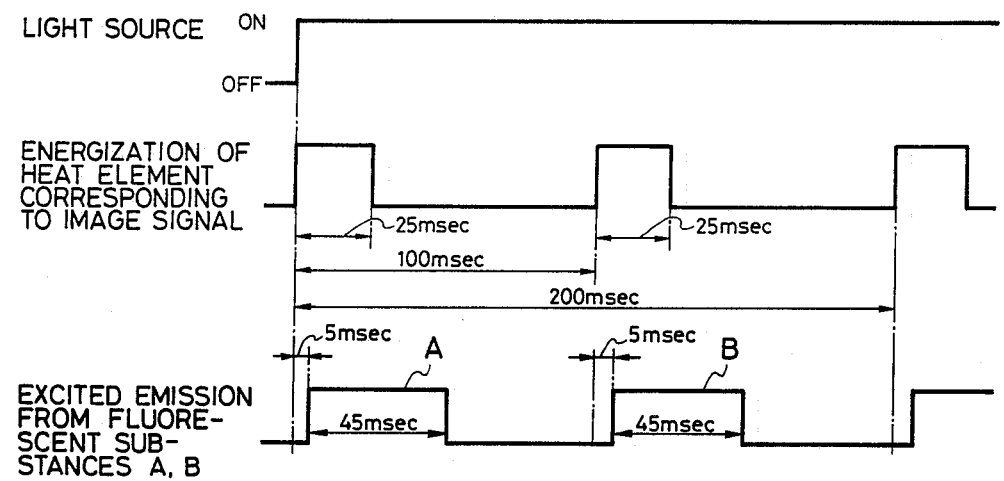
FIG. 21 is a timing chart showing the relationship between the applications of light and heat.

An example of the recording system employing the aforesaid illumination apparatus will be described with reference to FIG. 20. In the following description, like reference numerals are used to denote the like or corresponding elements which constitute each of the components shown in the above-described respective embodiments, and detailed description is omitted for the sake of simplicity.

The following description concerns the operation of alternate application of the respective waves having the spectral distributions A and B shown in FIG. 11 to the transfer recording medium 51 at the previously-described timing.

The rotary member 19 is alternately coated with the fluorescent substances A and B at intervals of 45 degrees in the circumferential direction of the member 19 (with the respective non-fluorescent areas coated with the paint P interposed between the substances A and B). If the rotary member 91 having this arrangement is rotated about its axis at a constant speed of 75 rpm, the light emitted from the fluorescent substances A and B alternately illuminates the transfer recording medium 51 through the slit 93 and the lens 94 with a period of 100 ms. If the light emitted from the light source 92 illuminates the paint P (an angle through which the paint P is coated is determined so that the light may illuminate it for 55 ms), the light is absorbed by the paint P. Therefore, no light illuminates the transfer recording medium 51. As can be seen from the timing chart shown in FIG. 21, even if the light source 92 is ON, rotation of the rotary member 91 at a constant speed enables alternate illumination of the transfer recording medium 51 with the light emitted from the fluorescent substances A and B with an illumination period of 45 ms at intervals of 100 ms.

The rotation of the rotary member 91 is phase-controlled so that, in the case of magenta recording, light having the spectral distribution A shown in FIG. 11 illuminates the transfer recording layer 8b while, in the case of blue recording, light having the spectral distribution B shown in FIG. 11 illuminates the same.

As described previously, the light emitted from the respective fluorescent substances A and B is passed through the slit 93 and is focused on the transfer recording layer 51b by the lens 94, thereby making the illumination width extremely narrow. In this embodiment, as shown in FIG. 7, the illumination width covers a range of about 60 μm on each side of the center line of the heat element array 53b. Accordingly, the illumination width is limited to the area of the transfer recording medium 51b which is heated by the heat elements.

In the above-described manner, the recording head 53a is controlled in response to respective image signals representing magenta, blue and white, so that a negative image is formed on the transfer recording layer 51b. The transfer recording medium 51 is transported in synchronism with a repetition cycle of 200 ms/line. In the transfer section 54, the transfer recording layer 51b having the thus-transferred image is heat-pressed against the recording sheet 58, thereby forming a transferred image composed of blue and magenta on the recording sheet 58. Subsequently, the transfer recording medium 51 is separated from the recording sheet 58 by the release roller 55, and the recording sheet 58 having an image recorded in desired color is discharged into the delivery tray 61 through a pair of delivers 63a and 63b.

As described above, two-color recording is effected by one shot.

FIG. 22A is a perspective view of a modification of the fourth preferred embodiment of the illumination apparatus L of the present invention with FIG. 22B showing the optical path of illuminating light.

In this modification, the light source is accommodated in the interior of the rotary member. A rotary member 114 of a cylindrical shape has a support frame 117 provided with two kinds of fluorescent plates 115 and a float-glass plates 22 therebetween, the fluorescent plates 115 each having a quartz glass substrate 115a coated with the fluorescent substances A and B and the respective plate 116 coated with the non-transmissive black paint P. The fluorescent substances A and B and the paint P are the same as those used for the rotary member shown in FIG. 19. The rotary member 114 has a built-in light source 118 constituted by the germicidal lamp GL-10. The light emitted from the light source 118 causes excited emission of either of the fluorescent substances A, B, and the light thus emitted is passed through a slit 119, reflected and converged by a reflection mirror 120, and thereby illuminating the subject 51.

In addition, each end of the rotary member 114 is maintained in pressure contact with one driving roller 121 and two driven rollers 122 to rotatably support the rotary member 114. When the driving roller 121 is rotated via an associated gear 123a by the motion of a motor 123 at a predetermined speed, the rotary member 114 is caused to rotate about its axis.

Accordingly, if the illumination apparatus L having the above-described arrangement is incorporated into the previously-described recording system, the rotary member 20 being rotated at a predetermined speed and at the same time the light source 118 being turned on and off in synchronism with a recording speed, it is possible to achieve the same effect as that of the previously-described embodiments.

Figure 22:
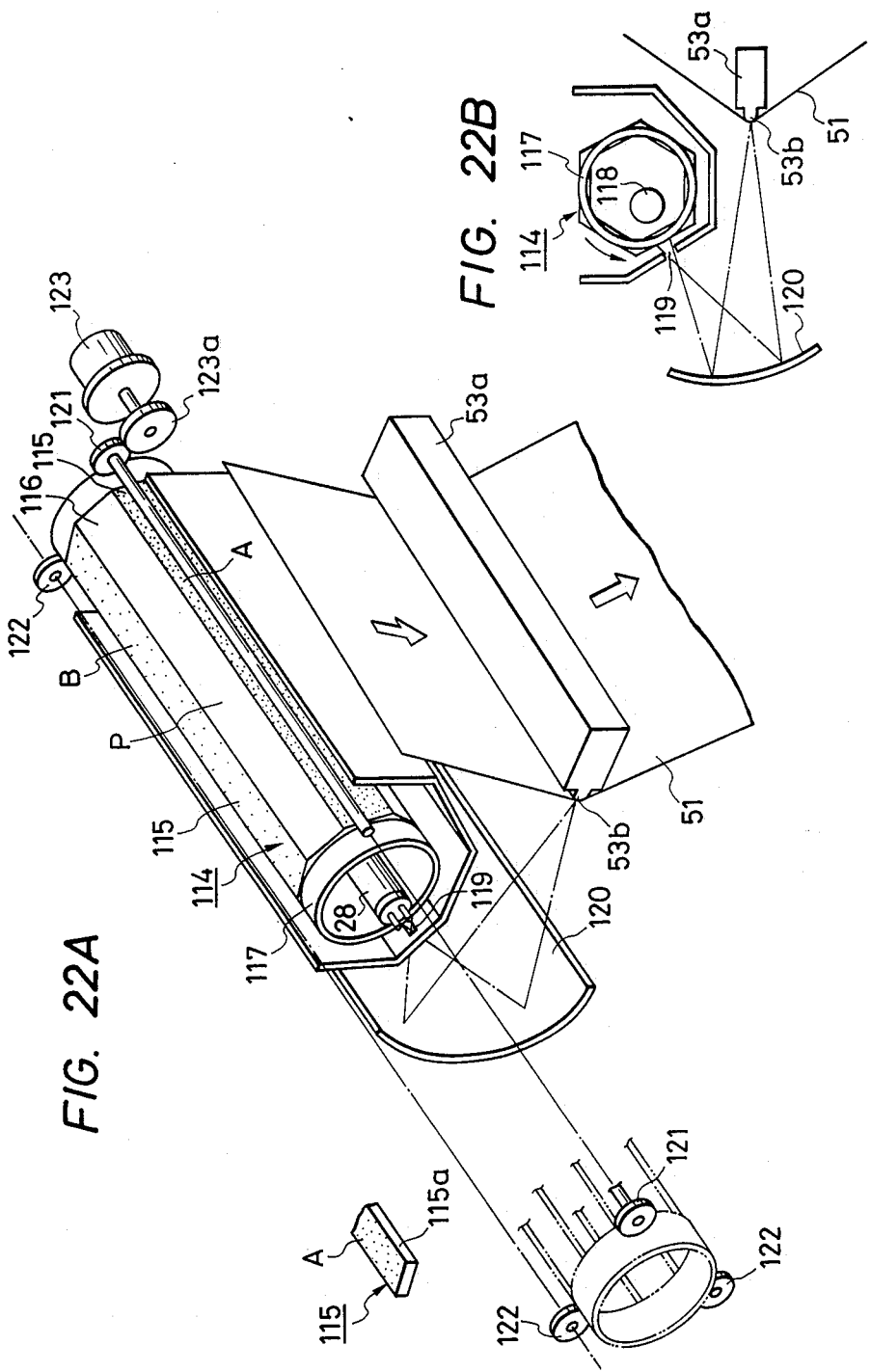
FIGS. 22A, 22B and 23 are schematic views respectively used as an aid in explaining modifications of the fourth embodiment.

It is to be noted that in the modification shown in FIG. 22 the inner surface of the rotary member 114 may be coated with the fluorescent substances A and B and the paint P. As a matter of course, the image formation may also be performed by means of a lens system instead of the reflection mirror 120.

Figure 23:
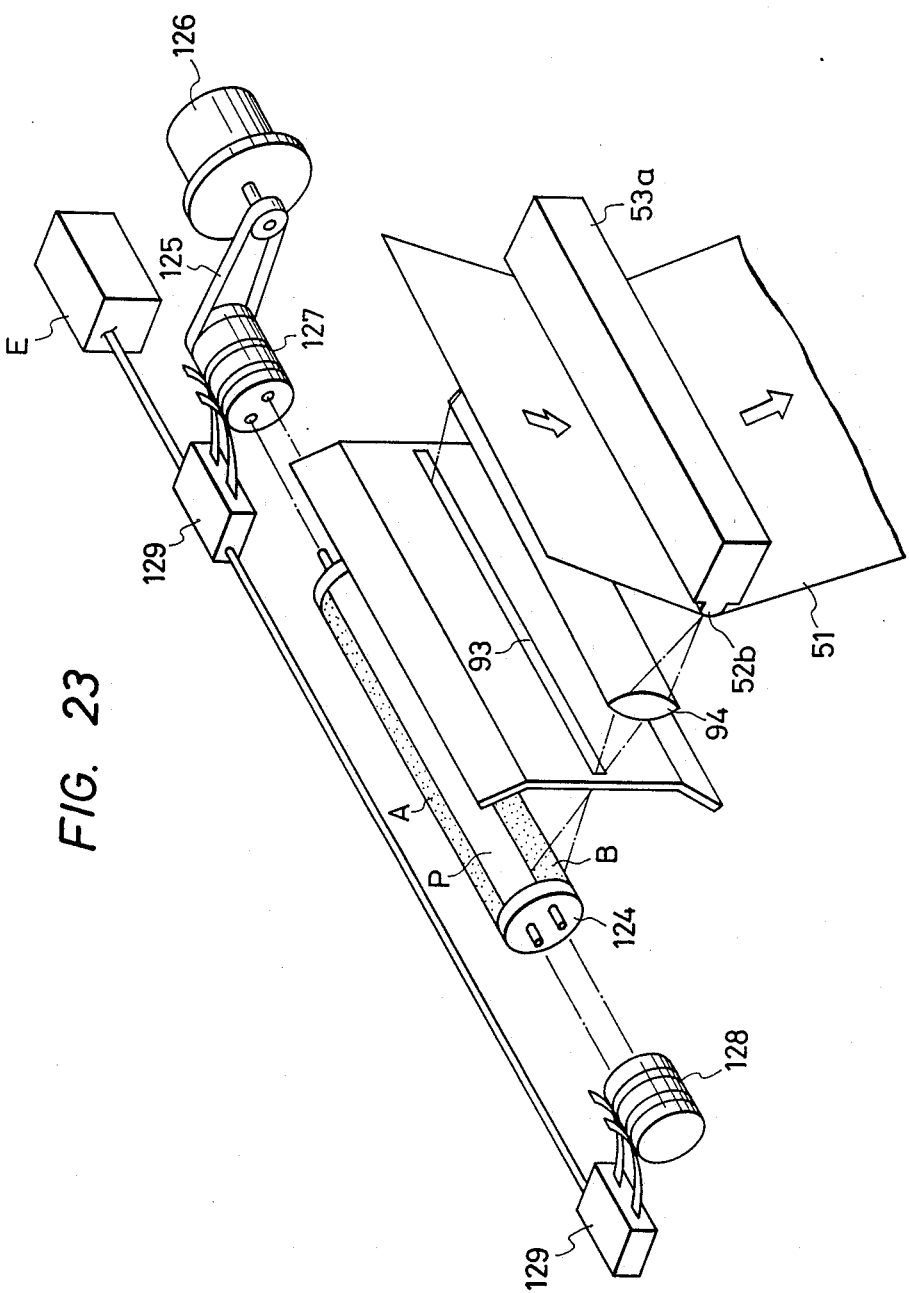

FIG. 23 shows a further modification of the fourth preferred embodiment of the illumination apparatus L in accordance with the present invention. As shown, a light source 124 per se has an outer surface coated with the fluorescent substances A and B and the paint P in a longitudinally striped manner similar to that of the previously-described modification. The light source 124 has at one end a lamp socket 127 with a pulley coupled with a motor 126 via a timing belt 125 and at the other end a socket 128 having slip rings. The respective sockets 127 and 128 are rotatably supported by bearings (not shown) and are arranged to be kept in contact with each electrode 129 made of leaf springs. Therefore, since the light source 124 is connected to an electric power supply E via the leaf-spring electrodes 129, even while the light source 124 is being rotated about its axis, it can be turned on.

The aforesaid light source 27 serving also as the rotary member is caused to rotate about its axis at a predetermined speed by the motor 126, and the light emitted from the excitation of the fluorescent substances A and B is focused on the subject 51 through the slit 93 and the lens 94 as is the case with the modification shown in FIG. 19. This makes it possible to achieve the same effect as that of the previously-described modification.

It will be appreciated that, although two kinds of fluorescent substances are used in the above-described modifications shown in FIGS. 22A and 23, the number of kinds of fluorescent substances employed may be altered as occasion demands.

As described above, the fourth preferred embodiment is arranged in such a manner that the rotary member having the fluorescent substance area and the nonfluorescent substance area is rotated about its axis to allow the light emitted from the fluorescent substances to be cast on the subject, so that it is possible to cast the light derived from excited emission of the fluorescent substances intermittently and in a predetermined cycle while the light source for emitting light is switched on. Therefore, no lighting circuit such as a light source is needed, and the lifetime which might otherwise be limited by that of the light source can therefore be improved.

If the fluorescent substance area is constituted by two or more areas having different spectral characteristics, it is possible to cast light having a plurality of spectral characteristics on the subject in a high-speed switched over manner.

In addition, if the above-described illumination apparatus is used to constitute a recording system in which the transfer recording medium is illuminated with light, illumination can be performed in units of extremely narrow width, thereby obtaining a high quality image free from picture noises at high speed.

The fifth embodiment will be described below with reference to FIGS. 24 to 29.

The fifth embodiment of an illumination apparatus which will be described below comprises: a light source having two or more kinds of fluorescent substances on its periphery and disposed for rotation about its axis; drive means for causing rotation of the light source; and an optical separation member disposed in the light source for separating the light derived from the excitation of the respective fluorescent substances. An example of a recording system using the fifth embodiment is arranged in such a manner that the illumination apparatus imparts light energy to a member on which an image is formed, thereby transferring an image onto a recording medium and forming the image thereon.

In this arrangement, when the light source is turned on, the fluorescent substances provided on the periphery of the light source are excited to emit light having different wavelengths, respectively. The light thus emitted is separated into the respective wavelengths by the separation member. Therefore, if the light source is rotated by the drive means, the separated light alternately illuminates the subject from the same position on the light source in a switched over manner. The switching speed can be freely adjusted by controlling the rotational speed of the light source.

Figure 24:
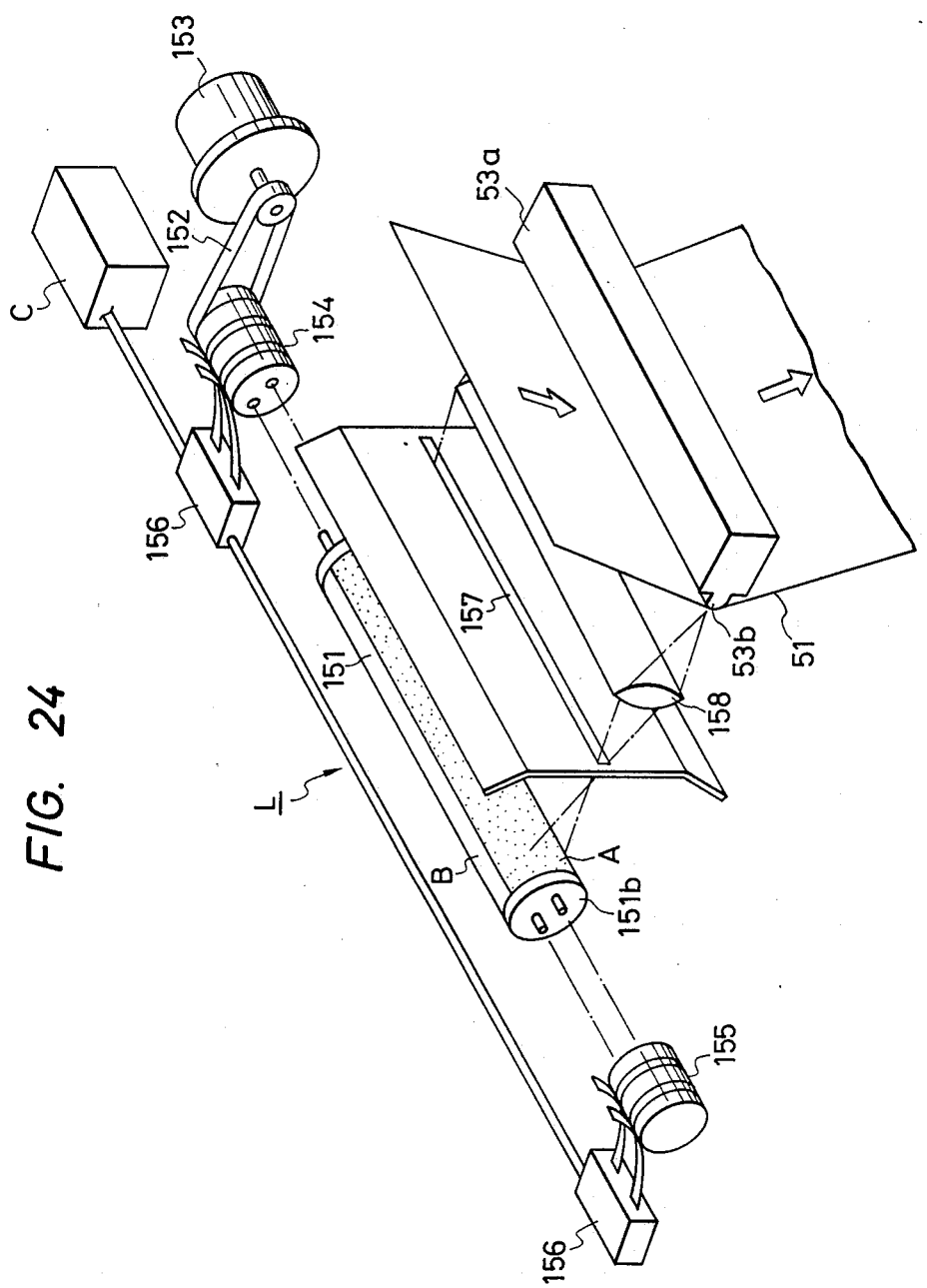
FIG. 24 is a schematic, perspective view of a fifth preferred embodiment of the illumination apparatus in accordance with the present invention.

FIG. 24 is a perspective view of the illumination apparatus L for providing two kinds of spectral charactristics.

As shown, a fluorescent lamp 151 serves as a light source and the fluorescent lamp 151 has a lamp socket 154 with a pulley, the lamp socket 154 being coupled with a servo motor 153 by a timing belt 152. The other end of the fluorescent lamp 151 has a socket 155 provided with slip rings. The sockets 154 and 155 are rotatably supported by bearings (not shown), and electrodes 156 made of leaf springs connected to a fluorescent lamp driving circuit C are maintained in contact with the respective sockets 154 and 155.

Therefore, the fluorescent lamp 151 is capable of being rotated about its axis by the motion of the motor 153. Since a driving current is supplied to the fluorescent lamp 151 through the electrodes 156 even while the lamp 151 is being rotated, the lamp 151 can be turned on.

The arrangement is such that the light emitted by the excitation of the fluorescent lamp 151 is passed through a slit 157 and a lens 158, and illuminates the subject 51.

The aforementioned fluorescent lamp 151 is described in further detail. As shown in FIGS. 25A and 25B, a cylindrical glass tube 151a has an inner surface which is separately coated with the fluorescent substances A and B at intervals of 180 degrees in the circumferential direction. A separation member 160 is disposed in correspondence with the separate coating so as to divide the interior of the tube 151a into two equal parts in the axial direction. The separation member 160 is disposed to prevent the respective waves emitted from one of the fluorescent substances A and B from being incident on the other thereof.

The fluorescent substance A is composed of $(Ca,Zn)_3(PO)_2$ as a base substance and Tl as an activator while the other fluorescent substance B is composed of $SrMgP_2O_7$ as a base substance and $Eu^{2+}$ as an acrivator. The respective spectral distributions of light from the fluorescent substances A and B are as shown in FIG. 11. The separation member 160 is constituted by a plate made of aluminium 160, and is fixed at its both ends to the inner walls of bases 151b of the fluorescent lamp 151. The glass tube 151a of the respective fluorescent members 42 is made of quarts glass which is a material exhibiting proper transmittance in the wavelength range shown in FIG. 11.

The use of the illumination apparatus L having the above-described arrangement will be explained below.

When voltage is applied to electrodes 151c disposed at the opposite ends of the fluorescent lamp 151, electric discharge is initiated to generate excited light having a principal wavelength of 253.7 nm. This causes excited emission of the fluorescent substances A and B.

As described above, the light emitted from the fluorescent substance A is transmitted outwardly through the wall of the tube 151a but is partially directed inwardly thereof. However, the light directed inwardly is reflected by the separation member 160 to advance outwardly from the tube 151a. This principle is applied to the fluorescent substance B as well.

More specifically, the fluorescent substance A emits the light indicated by the curve A in FIG. 11 and illuminates the side I defined the separation member 160 as viewed in FIG. 25B. The fluorescent substance B emits the light indicated by the curve B in FIG. 12 and illuminates the side II defined by the separation member 160 as viewed in FIG. 25B. Accordingly, if the fluorescent lamp 151 is caused to rotate about its axis, the wavelengths indicated by the curves A and B shown in FIG. 11 are cast on the subject 51 in an alternately switched over manner at speeds corresponding to the rotational speed of the fluorescent lamp 151.

Referring back to FIG. 24, the light which illuminates the subject 51 through the slit 157 and the lens 158 has different spectral characteristics but is emitted from the sam fluorescent lamp 151. Therefore, the light is capable of illuminating the subject 51 in an extremely narrow form without involving the dislocation of illumination.

In addition, since the aforesaid illumination apparatus L does not need a plurality of fluorescent lamps, a single drive circuit may be provided, so that it is possible to reduce the space occupied by the drive circuit.

Figure 26:
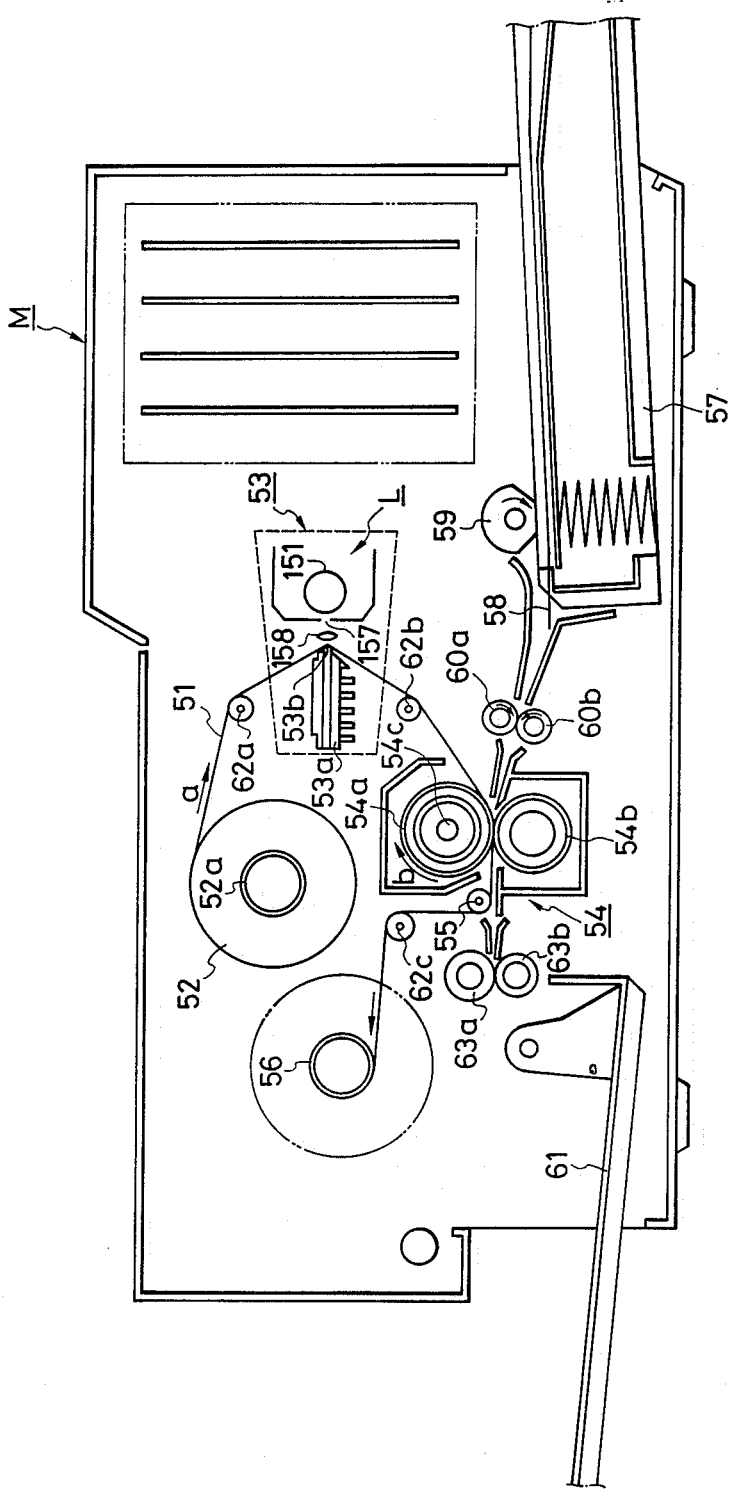
FIG. 26 is a schematic view of an example of a recording system which is constructed having the illumination apparatus shown in FIG. 24.

An example of a recording system using the above-described illumination apparatus L will be described below with reference to FIG. 26. In the following description, like reference numerals are used to denote the like or corresponding elements which constitute each of the components shown in the above-described respective embodiments, and detailed description is omitted for the sake of simplicity.

As shown in FIG. 13, the transfer recording medium 51 has the sheet-like substrate 51a on which the transfer-recording layer 51b is deposited, the transfer-recording layer 51b having the property of enabling an image to be formed thereon when subjected to heat energy and light energy at the same time.

An example of the transfer recording layer 51b is described below in detail. As shown in FIG. 13, the layer 51b includes cores 51c and 51d containing the components listed in Tables 4 and 5 which will be described later, the respective cores 51c and 51d being formed into microcapsular image forming elements by the previously-described method.

TABLE 4

| Item | Component | wt % |
| --- | --- | --- |
| Polymerizable Prepolymer | 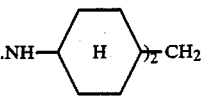 | 68 |
| Reaction initiator | Irgacure-184 (Manufactured by CIBA-GEIGY)/ Ethyl-p-dimethylaminobenzoate | 2/2 |
| Binder | Elvacite 2041 (Manufactured by duPont) | 23 |
| Coloring Agent | Sumitoncarmine (Manufactured by Sumitomo Chemical Co., Ltd.) | 5 |

TABLE 5

| Item | Component | wt % |
| --- | --- | --- |
| Polymerizable Prepolymer | 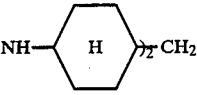 | 68 |
| Reaction initiator | 2-chlorothioxanthone/ Ethyl-p-dimethylaminobenzoate | 1.4/2 |
| Binder | Elvacite 2041 (Manufactured by duPont) | 23.6 |
| Coloring Agent | Lionell Blue FG-7330 (Manufactured by Toyo Ink Mfg. Co., Ltd.) | 5 |

The respective image forming elements produced in the previously-described manner are bonded by the adhesive 51f to the carrier 51a; thereby obtaining the transfer recording layer 51.

In more detail, the adhesive 51f was composed of a polyester-based adhesive polyester LP-022 manufactured by Nippon Gosei Kagaku Kogyo Kabushiki Kaisha (including 50% solid components) and toluene, Polyester Lp-022 being dissolved in toluene is a ratio of 1cc of the former to 3cc of the latter. The thus-obtained adhesive 51f was coated over the carrier 51a made of a 6 μm thick polyethylene telephthalate film. Subsequently, the solvent was dried and removed, and the adhesive 51f measured about 1 μm in thickness. Since the adhesive 51f had a glass transition point of $-15°$ C., it is easy to deposit the thus-produced image forming elements onto the carrier 51a.

Then, the microcapsular image forming elements were prepared using core materials listed in Tables 4 and 5, and the two elements were mixed together in a ratio of 1 : 1. The mixture were sprinkled over the viscous deposited layer, being made to adhere thereto. Subsequently, an extra amount of image forming elements were removed, so that 90% of the image forming elements remained and were disposed as one layer on the deposited layer.

Subsequently, a pressure of about 1 kg/cm$^2$ and heat energy of about 80° C. were applied so as to rigidly fix the image forming elements to the carrier 51a, so that the transfer recording medium 51 was formed.

Figure 27:
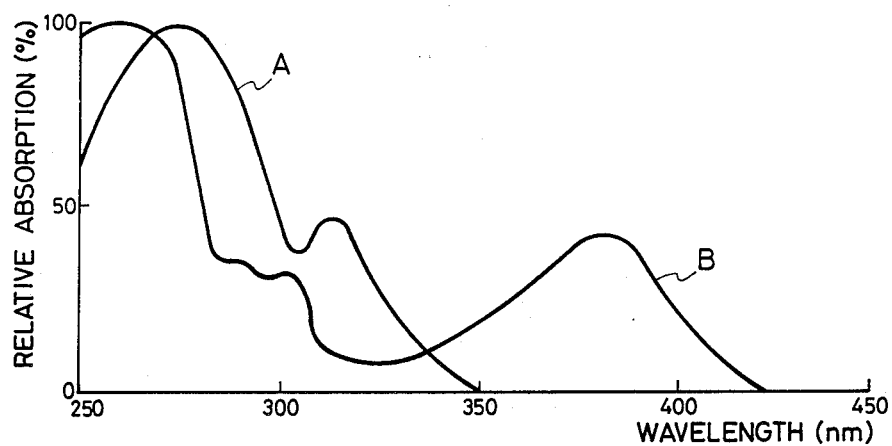
FIG. 27 is a graph showing the absorption characteristics of the light starting agent contained in the transfer recording medium used in the fourth embodiment.

Referring to FIG. 27 showing absorption characteristics, the reaction initiator in the image forming element shown in Table 4 starts its chemical reaction when absorbing the light in the wavelength range indicated by a curve A, exhibiting magenta in an image formed. On the other hand, the reaction initiator shown in Table 5 starts its chemical reaction when absorbing the light in the wavelength range indicated by a curve B, exhibiting blue in an image formed.

The following description concerns the operation of alternate application of the respective waves having the spectral distributions A and B shown in FIG. 11 to the transfer recording medium 51 at the above-described timing. When the fluorescent lamp 151 of the illumination apparatus L shown in FIG. 24 is rotated at a constant speed of 300 rpm (200 ms/revolution), the respective fluorescent substances A and B alternately assume face-to-face relationship with the transfer recording medium 51 via the slit 157 and the lens 158 with a period of 100 ms. Therefore, when the fluorescent lamp 151 is turned on in accordance with the timing chart shown in FIG. 6, the rotation of the fluorescent lamp 151 is phase-controlled so that the light emitted from either of the fluorescent substances A, B may illuminate the transfer recording layer 51b via the slit 157 and the lens 158. In consequence, in the case of magenta recording, the light having the spectral distribution A shown in FIG. 11 illuminates the transfer recording layer 51b while, in the case of blue recording, the light having the spectral distribution B shown in FIG. 11 illuminates the same.

Since the light illuminates the transfer recording layer 51b from the same position, the illumination width becomes extremely narrow. In consequence, the illumination width is limited to the area of the transfer recording medium 51b which is heated by the heat elements.

In the above-described manner, the recording head 53a is controlled in response to respective image signals representing magenta, blue and white and at the same time the transfer recording layer 51b is illuminated with light having a predetermined wavelength, thereby transferring an negative image thereon. The transfer recording medium 51 is transported in synchronism with a repetition cycle of 200 ms/line. In the transfer section 54, the transfer recording layer 51b having the thus-transferred image is heat-pressed against the recording sheet 58, thereby forming an transferred image composed of blue and magenta on the recording sheet 58. Subsequently, the transfer recording medium 51 is separated from the recoding sheet 58 by the release roller 55, and the recording sheet 58 having an image recorded in desired color is discharged into the delivery tray 68 by the motion of a pair of the delivery rollers 63a and 63b.

As described above, two-color recording is effected by one shot.

One modification of the illumination apparatus L will be described below.

The above-described embodiment is arranged in such a manner that the separation member 160 made up of an aluminum plate is mounted on the interior of the fluorescent lamp 151 so that the member 160 may reflect light. However, the effect can be further enhanced by the use of the arrangement shown in FIGS. 28A and 28B.

More specifically, as shown in FIG. 28B, the fluorescent substances A and B are coated on the opposite surfaces of a separation member 174 to be mounted on the interior of the fluorescent lamp 151, the kinds of fluorescent substances A, B to be coated corresponding to the fluorescent substance A or B which is coated on the inner tube wall facing the respective surfaces of the separation member 174.

In this arrangement, since the inner tube wall and the surfaces of the separation member are coated with the fluorescent substances, it is possible to achieve the effect equivalent to a case where two fluorescent lamps each having a different spectral characteristic are unified.

As shown in FIGS. 29A and 29B, a spectral member 175 may be constituted by a material exhibiting non-transmittance or extremely low transmittance in the wavelength range shown in FIG. 11. For example if the optical separation member 175 including a steel bar covered with a thin Sn film is mounted on the interior of the fluorescent lamp 175, the light which is emitted from the fluorescent substance A (or B) and which is directed inwardly of the tube is absorbed by the optical separation member 175, so that it does not reach the fluorescent substance B (or A) deposited on the other side. Therefore, similar to the fluorescent lamp 151 shown in FIGS. 25A, 25B, 28A and 28B, this modification also functions as a fluorescent lamp having two kinds of spectral characteristics.

It is to be noted that, although any of the above-described modifications uses two kinds of the fluorescent substances A and B, three or more kinds of fluorescent substance may be used. If three or more kinds of fluorescent substance are coated over the inner or outer surface of the fluorescent lamp 151 in a longitudinally striped manner, it is possible to illuminate the subject with light having three or more kinds of spectral characteristics in a sequentially switched over manner.

As described above, the above-described fifth embodiment comprises the rotatable light source having a plurality of fluorescent substances and the optical separation member disposed therein for separating the light emitted from the respective fluorescent substances. It is therefore possible to positively illuminate a limited area on the subject with light having a plurality of spectral characteristics in a high-speed switched over manner. In addition, since a plurality of light sources are not needed, production cost can be lowered and the space occupied by the light source can also be reduced.

If the above-described arrangement is incorporated into a recording system in which the transfer recording medium is illuminated with light, illumination in units of extremely narrow width can be performed, thereby providing a high-quality image free from picture noises at high speed. Furthermore, the formation of an image on the transfer recording medium and the transfer of the image are performed in sequence, whereby a clear image can also be formed on a subject of the type which has the surface inferior in flatness.

It is to be noted that, although the respective preferred embodiments refer to an example in which the fluorescent member is rotated, the invention is not limited soley to such an arrangement. For example, the fluorescent member may be moved in parallel with its longitudinal axis, that is, the respective fluorescent substances having different spectral characteristics have only to be repetitively located at a predetermined position.

As described above in detail, the present invention aims at providing an illumination apparatus capable of illuminating an extremely narrow range and a recording system incorporating the same.

What is claimed is:

1. An illumination apparatus adapted for illuminating an object with light, comprising:
   (a) a light-emitting member for emitting light;
   (b) a plurality of fluorescent substances each having a different spectral property and being disposed is different planes, said fluorescent substances emitting light by receiving light emitted from said light-emitting member; and
   (c) drive means for respectedly positioning said plurality of fluorescent substances at a predetermined position, where said fluorescent substances receive the light emitted from said light-emitting member.

2. An illumination apparatus adapted for illuminating an object with light, comprising:
   a light-emitting member for emitting light;
   a plurality of fluorescent substances each having a different spectral property, said fluorescent substances emitting light by receiving light emitted from said light-emitting member;
   drive means for repeatedly positioning said plurality of fluorescent substances at a predetermined position, where said fluorescent substances receive the light-emitted from said light-emitting member; and
   a rotary member, wherein said plurality of fluorescent substances are coated on a circumferential surface of said rotary member.

3. An illumination apparatus according to claim 2 wherein said plurality of fluorescent substances are coated on said rotary member disposed for rotation about its axis thereof.

4. An illumination apparatus according to claim 1 further comprising non-fluorescent substances, said drive means repeatedly positioning said fluorescent substances and said non-fluorescent substances at a predetermined position.

5. An illumination apparatus according to claim 1 further comprising a wavelength selecting substance for performing one of transmission and reflection of light have a predetermined wavelength, said drive means repeatedly positioning said fluorescent substances and said wavelength selecting substance at a predetermined position.

6. An illumination apparatus according to claim 1 further comprising a slit allowing for the passage of light from said fluorescent substances.

7. An illumination apparatus according to claim 1 further comprising a lens for focusing the light reflected from said fluorescent substances.

8. An illumination apparatus according to claim 1 further comprising a plurality of non-fluorescent substances, said fluorescent substances and said non-fluorescent substances being alternately disposed.

9. An illumination apparatus according to claim 1 further comprising a wavelength selecting substance for performing one of transmission and reflection of light having a predetermined wavelength, said fluorescent substances and said wavelength selecting substances being alternately disposed.

10. An illumination apparatus adapted for illuminating an object with light, comprising:
    (a) a light-emitting member for emitting light;
    (b) a rotatable light source provided along a circumferential surface of said light-emitting member and having two or more kinds of fluorescent substances, each said fluorescent substance being capable of emitting light by receiving light from said light-emitting member causing excitation thereof;
    (c) drive means for rotating said light source; and
    (d) an optical separation member provided in said light source for optically separating the light emitted by the excitation of said fluorescent substances.

11. An illumination apparatus according to claim 12, wherein said fluorescent substances are formed on a cylindrical glass tube.

12. An illumination apparatus adapted for illuminating an object with light, comprising:
    (a) a light-emitting member for emitting light;
    (b) a plurality of fluorescent substances coated on a circumferential surface, said fluorescent substances each having a different spectral property and emitting light by receiving light emitted from said said light-emitting member; and
    (c) drive means for repeatedly positioning said plurality of fluorescent substances at a predetermined position, where said fluorescent substances receive the light-emitted from said light-emitting member, said drive means having a rotatable cylindrical roller defining said circumferential surface for bearing said fluorescent substances.

13. An illumination apparatus adapted for illuminating an object with light, comprising:
    (a) a light-emitting member for emitting light;
    (b) a plurality of fluorescent substances each having a different spectral property and being disposed in different planes, said fluorescent substances emitting light by receiving light emitted from said light-emitting member; and
    (c) drive means for repeatedly positioning said plurality of fluorescent substances at a predetermined position where said fluorescent substances receive the light emitted from said light-emitting member, said drive means having a rotatable polygonal roller for bearing said fluorescent substances.

14. An illumination apparatus adapted for illuminating an object with light, comprising:
    (a) stationary light-emitting member for emitting light;
    (b) a rotatable light source having said light-emitting member therein and a plurality of fluorescent disposed in different planes, said fluorescent substances emitting light by receiving light from said light-emitting member; and
    (c) drive means for rotating said light source.

15. An illuminating apparatus according to claim 1, wherein said light-emitting member is stationary.

16. An illuminating apparatus according to claim 10, wherein said light-emitting member is stationary.

17. An illuminating apparatus according to claim 10, wherein each of said two or more kinds of fluorescent substances has a different spectral property.

18. An illuminating apparatus according to claim 14, wherein said light source has a hollow cylindrical shape.

19. An illuminating apparatus according to claim 14, wherein a slit is provided in an optical path between said light source and said object.

20. An illumination apparatus according to claim 2, wherein said rotary member includes a rotary shaft and further comprises rotating means for rotating said rotary member.

21. An illumination apparatus according to claim 2, wherein said rotating means includes an endless belt supported on first and second pulleys, with said first pulley being coupled to said rotary shaft and said second pulley being coupled to a power source.

22. An illumination apparatus for illuminating a subject to be illuminated with light, comprising:
a light source for generating light;
a plurality of fluorescent substances coated on a circumferential surface, each said fluorescent substance having a different spectrum for receiving the light generated from said light source and emitting light having a wavelength different from a wavelength of the light generated from said light source for illuminating the subject;
a circumferential roller holding member defining said circumferential surface for holding said plurality of fluorescent substances; and
driving means for moving said holding member for repeatedly positioning said plurality of fluorescent substances at a peredetermined position at which said fluorescent substances receive the light generated from said light sources.

23. An illumination apparatus for illuminating a subject to be illuminated with light, comprising:
a light source for generating light;
a plurality of fluorescent substances disposed in different planes, each said fluorescent substance having a different spectrum for receiving the light generated from said light source and emitting light having a wavelength different from a wavelength of the light generated from said light source for illuminating the subject;
a polygonal member for holding said plurality of fluorescent substances; and
driving means for moving said holding member for repeatedly positioning said plurality of fluorescent substances at a predetermined position at which said fluorescent substfances receive the light generated from said light source.

24. An illumination apparatus according to claim 23, wherein said light source is disposed inside of said holding member holding said plurality of fluorescent substances.

25. An illumination apparatus according to claim 22 or 23 wherein said holding member is rotated by a driving force from said driving means.

26. An illumination apparatus according to claim 22 or 23 wherein said light source has an elongate shape.

27. An illumination apparatus according to claim 22 or 23 wherein said light source is disposed between the subject and said fluorescent substances.

28. An illumination apparatus according to claim 22 or 23 wherein said holding member has a cylindrical shape and said light source is disposed inside of said holding member holding said plurality of fluorescent substances.

* * * * *

UNITED STATES PATENT AND TRADEMARK OFFICE
CERTIFICATE OF CORRECTION

PATENT NO. : 4,963,895
DATED : October 16, 1990
INVENTOR(S) : TOSHIAKI HARADA, ET AL.

It is certified that error appears in the above-identified patent and that said Letters Patent is hereby corrected as shown below:

COLUMN 1

Line 32, "speed" should read --speed.--.

COLUMN 7

Line 9, "curve A." should read --curve A,--.
    Line 11, "when absorbing the light" should read
        --initiator shown in--.

COLUMN 8

Line 7, "recod-" should read --record- --.
    Line 23, "is" should read --are--.
    Line 46, "above-discribed" should read
        --above-described--.

COLUMN 9

Line 24, "an" should read --a--.
    Line 35, "optional path" should read --optical path--.
    Line 68, "maybe" should read --may be--.

COLUMN 10

Line 23, "is" should read --it--.
    Line 33, "disc-lie" should read --disc-like--.

COLUMN 11

Line 61, "flourescent" should read --fluorescent--.

UNITED STATES PATENT AND TRADEMARK OFFICE
CERTIFICATE OF CORRECTION

PATENT NO. : 4,963,895
DATED : October 16, 1990
INVENTOR(S) : TOSHIAKI HARADA, ET AL.

It is certified that error appears in the above-identified patent and that said Letters Patent is hereby corrected as shown below:

COLUMN 12

Line 19, "flourescent" should read --fluorescent--.

COLUMN 13

Line 27, "deposited" should read --deposited,-- and "reacording" should read --recording--.
    Line 59, "recoding" should read --recording--.

COLUMN 14

Line 16, "imagae" should read --image--.

COLUMN 15

Line 28, "an" should read --a--.

COLUMN 17

Line 26, "sheet like" should read --sheetlike--.
    Line 28, "aluminium" should read --aluminum--.
    Line 56, "8," should read --B,--.

COLUMN 18

Line 5, "emits" should read --emit--.
    Line 9, "edged" should read --edges--.

UNITED STATES PATENT AND TRADEMARK OFFICE
CERTIFICATE OF CORRECTION

PATENT NO. : 4,963,895
DATED : October 16, 1990
INVENTOR(S) : TOSHIAKI HARADA, ET AL.

It is certified that error appears in the above-identified patent and that said Letters Patent is hereby corrected as shown below:

COLUMN 18

Line 20, "cause" should read --causes--.
    Line 45, "FIGS. 18." should read --FIG. 18.--.

COLUMN 19

Line 39, "an" should read --a--.

COLUMN 20

Line 27, "in" should read --is--.
    Line 28, "substance" should read --substances--.

COLUMN 21

Line 17, "difference" should read --different--.

COLUMN 22

Line 18, "delivers 63a" should read --delivery rollers 63a--.
    Line 30, "and a float-glass plates 22 therebetween," should be deleted.

COLUMN 24

Line 45, "acrivator." should read --activator.--.
    Line 52, "quarts" should read --quartz--.

UNITED STATES PATENT AND TRADEMARK OFFICE
CERTIFICATE OF CORRECTION

PATENT NO. : 4,963,895
DATED : October 16, 1990
INVENTOR(S) : TOSHIAKI HARADA, ET AL.

It is certified that error appears in the above-identified patent and that said Letters Patent is hereby corrected as shown below:

COLUMN 25

Line 3, "defined the" should read --defined by the--.
Line 47, "sam" should read --same--.

COLUMN 26

Line 59, "were" should read --was--.

COLUMN 27

Line 42, "an" should read --a--.
Line 47, "an" should read --a--.
Line 50, "recoding" should read --recording--.

COLUMN 29

Line 6, "is" should read --in--.
Line 10, "respectedly" should read --repeatedly--.
Line 24, "light-emitted" should read --light emitted--.
Line 31, "thereof" should be deleted.
Line 40, "have" should read --having--.

COLUMN 30

Line 5, "claim 12," should read --claim 10,--.
Line 14, "said" (second occurrence) should be deleted.
Line 19, "light-emitted" should read --light emitted--.
Line 42, "fluorescent dis-" should read --fluorescent substances each having a different spectral property and being dis- --.

UNITED STATES PATENT AND TRADEMARK OFFICE
CERTIFICATE OF CORRECTION

PATENT NO. : 4,963,895

DATED : October 16, 1990

INVENTOR(S) : TOSHIAKI HARADA, ET AL.

It is certified that error appears in the above-identified patent and that said Letters Patent is hereby corrected as shown below:

COLUMN 30

Line 47, "illuminating" should read --illumination--.
Line 49, "illuminating" should read --illumination--.
Line 51, "illuminating" should read --illumination--.
Line 54, "illuminating" should read --illumination--.
Line 57, "illuminating" should read --illumination--.

COLUMN 31

Line 16, "peredetermined" should read --predetermined--.

COLUMN 32

Line 8, "substfances" should read --substances--.
Line 23, "or 23" should be deleted.

Signed and Sealed this

Twenty-fifth Day of August, 1992

Attest:

DOUGLAS B. COMER

Attesting Officer

Acting Commissioner of Patents and Trademarks